United States Patent [19]

Higashi et al.

[11] Patent Number: 5,676,901
[45] Date of Patent: Oct. 14, 1997

[54] PROCESS FOR RESIN-COATING OF RESIN MOLDINGS, RESIN-COATING APPARATUS FOR USE IN THE PROCESS

[75] Inventors: Keiji Higashi; Koichi Uesaki; Masunori Kobayakawa; Shusuke Matsumura; Hisanao Kajiura; Yoshikazu Maki; Yoshinori Uno; Shigeru Oka, all of Osaka; Shigeo Yoshida, deceased, late of Osaka; Kiyo Yoshida, executor, Yokkaichi; Tomo Yoshida, executor, Yokkaichi; Shikiko Yoshida, executor, Yokkaichi; Yukio Yoshida, executor, Yokkaichi, all of Japan

[73] Assignee: Matsushita Electric Works, Ltd., Osaka, Japan

[21] Appl. No.: 170,354

[22] PCT Filed: Jun. 29, 1993

[86] PCT No.: PCT/JP93/00895

§ 371 Date: Jan. 4, 1994

§ 102(e) Date: Jan. 4, 1994

[87] PCT Pub. No.: WO94/00284

PCT Pub. Date: Jan. 6, 1994

[30] Foreign Application Priority Data

| Jun. 19, 1992 | [JP] | Japan | 4-172611 |
| Jun. 30, 1992 | [JP] | Japan | 4-172612 |
| Jul. 2, 1992 | [JP] | Japan | 4-175488 |
| Jul. 3, 1992 | [JP] | Japan | 4-176482 |
| Aug. 14, 1992 | [JP] | Japan | 4-216956 |
| Aug. 14, 1992 | [JP] | Japan | 4-216957 |
| Aug. 14, 1992 | [JP] | Japan | 4-216959 |
| Oct. 20, 1992 | [JP] | Japan | 4-281706 |

[51] Int. Cl.$^6$ .................. B29C 45/16; B29C 45/14; B29C 41/22; B29C 41/20

[52] U.S. Cl. .................. 264/255; 264/259; 264/260; 264/261; 264/279; 425/553; 425/566

[58] Field of Search ............. 428/224; 264/255, 264/246, 279, 325, 244, 257, 755; 425/553, 566; 427/135; 156/87, 244.26, 245, 279, 280, 285, 286

[56] References Cited

U.S. PATENT DOCUMENTS

| 4,076,788 | 2/1978 | Ditto | 264/255 |
| 4,668,460 | 5/1987 | Ongena | 264/255 |
| 4,783,298 | 11/1988 | Oda | 264/155 |

FOREIGN PATENT DOCUMENTS

| 50-137250 | 10/1975 | Japan . |
| 55-154123 | 12/1980 | Japan . |
| 2-34217 | 3/1990 | Japan . |
| 3-272816 | 12/1991 | Japan . |
| 5-84759 | 4/1993 | Japan . |

*Primary Examiner*—Richard Weisberger
*Attorney, Agent, or Firm*—Burns, Doane, Swecker & Mathis, L.L.P.

[57] ABSTRACT

Consequently, the resin molding can be coated over the whole surface with a coating material uniformly and with an excellent adhesion.

A molding material is compressed and molded with a mold comprising split molds and capable of forming a space between them outer periphery and slidable position of which are tapered, the molds are mutually separated before complete curing to define a space between at least one side surface of the molding and an opposing surface of the mold, a gas flow is formed inside the molds and in a direction towards the outer periphery for discharging any foreign material such as molding-flash and dust through the space to the exterior of the molds, and a fluid coating material is injected in the space between the molding and the surface of the mold and, with the molds clamped again, compressed to be cured.

15 Claims, 29 Drawing Sheets

PROCESS FOR RESIN-COATING OF RESIN MOLDINGS, RESIN-COATING APPARATUS FOR USE IN THE PROCESS

Specification

1. Technical Background of the Invention

This invention relates to a resin-coating process for forming a resin coating layer on one side surface of resin moldings prepared with upper and lower split molds employed and with a fluid coating material injected into the molds after the preparation of the moldings, a resin-coating apparatus for use in performing the process, material for use in performing the process, and a molded product such as, in particular, a bathtub and the like obtained through the particular process.

2. Disclosure of Prior Art

In molding the bathtub, paneling or the like made of a thermosetting resin, it has been common to form a resin coating on one side surface of the same, on the inner side surface in the case of the bathtub, for example, and as a practical process there has been a process known as an in-mold coating process, for example. According to this process, a pair of split molds comprising a stationary mold and a movable mold (generally constituted by such male mold as a lower mold and such female mold as an upper mold) are employed, and the process comprises a step of obtaining resin moldings of a predetermined shape with such molding material as a bulk or sheet shaped resin molding material (BMC, SMC etc) disposed between the split molds and thereafter subjected to a mold clamping (compression) and a hot pressing, and a step of coating the surface of each molding with the fluid coating material injected between one side surface of the resin molding and a surface of the mold, which process is advantageous in that the molding and coating can be carried out with the same apparatus employed and through sequential steps. In addition to this advantage, it is also possible to obtain a molded resin product having the surface beautifully coated and excellent in the smoothness.

Since in the foregoing process the molded resin product is manufactured generally with a thermosetting resin, the molding requires the heating along with the compression, whereas it is also necessary that, because the thermosetting resin is employed generally as the foregoing coating material, the material maintains the fluidity at its injecting step as cooled to an extent not causing the curing to excessively advance. Accordingly, there is a problem that temperature administration of the mold is complicated. In injecting the fluid coating material, further, it has been general that a mold which allows an excess body part to be formed at part of peripheral edge of the molded resin product is employed, and the fluid coating material is injected through a nozzle facing the excess body part, but there remains a problem that the coating material cannot be distributed constantly stably and sufficiently to the peripheral part at positions separated far from the excessive body part. Further, to cope with this, it may be possible to employ an arrangement having a plurality of the excess body parts, but it becomes necessary to provide mutually independent injecting means with respect to them, and there arises a problem that required costs for the mold rise or maintenance/administration or productivity of the apparatus is deteriorated.

With respect to the above, there has been suggested an improved apparatus such as disclosed in Japanese Patent Laid-Open Publication No. 62-160216, according to which there has been provided an apparatus for supplying the coating material from a substantially central position on reverse side of the resin molding, while the upper mold is arranged to be movable and the lower mold is made to be stationary. In the central part of the lower mold, means for injecting the coating material is ptovided, which means is provided with a casing incorporating a plug-shaped hole forming means for free projection and retraction, and this casing is disposed with a space interposed for restraining as much as possible a heat intrusion from its circumference, in particular, from the lower mold. When the foregoing resin molding is prepared, the hole forming means is projected to render the injecting means for the coating material to be in a state where its nozzle is closed, and the compression molding of the molding material is performed in a state where a through hole is made in the molding from the reverse side of the molding upon formation of the foregoing hole. Next, the hole forming means is retracted into the interior of the injecting means for the coating material, clamping pressure for the upper mold is released to allow it to be elevated and to have a space formed between a bottom face of the upper mold and the molding, and the fluid coating material is injected into the space by the injecting means for the coating material through the through hole in the resin molding. According to the present apparatus, therefore, the coating material can be injected from the reverse side of the molding, and the coating surface of the molded resin product can be formed uniformly.

In the case where the foregoing apparatus is used, however, there is a risk that the resin coating layer of a uniform thickness cannot be formed on the upper surface of the molding, due to that the molding is caused to adhere to the upper mold so as to move following the upper mold when the same is slightly elevated, and that, upon injection of the fluid coating material, this material intrudes between bottom surface of the mold and upper surface of the lower mold.

Here, there has been suggested a system in which the process of injecting the coating material from the front surface side of the resin molding is employed again, the coating material is injected without elevating the upper mold, that is, in a state where the compression force by the upper mold is slightly lowered, the upper mold is pushed up with injecting pressure of the coating material and the coating with the coating material is performed (which shall be referred to as "resin coating" hereunder). However, it has been relatively difficult to balance the compression force of the upper mold with the injection pressure for the coating material, and there have been many problems unsolved in respect of deflashing upon formation of the moldings or in the retention of uniformity of the resin coating layer.

DESCRIPTION OF THE INVENTION

Accordingly, the object of the present invention is to solve the foregoing problems, and to provide a process for the resin-coating which allows the deflashing of the resin moldings to be reliably carried out and the molding to be coated with the coating material in a uniform thickness over the whole surface of the molding, in particular, a process of resin-coating in a mold, to a resin-coating apparatus for use in the process, to a material for use in the mold-coating, and to the molded product obtained by the process, in particular, a bathtub.

According to a first feature of the present invention, therefore, there is provided a process for resin-coating, in particular, a resin-coating in a mold, characterized in that a molding material is compression molded with a mold comprising upper and lower molds employed, a space is defined at least between one surface on one mold side of the resin molding and the one mold facing the surface with engagement of the upper and lower molds loosened prior to a complete curing of the moldings, any mixing of foreign substance is prevented by formation of a gas flow path between both molds through the space, then a fluid coating material is injected into the space between the molding and the surface of the one mold, and the molds are clamped again to have them cured under a pressure.

In the present invention, next, there is provided a resin-coating process capable of, in an event where the resin moldings have an uneven configuration, eliminating any deficiency in adhesion properties of the resin coating layer with respect to the moldings due to an insufficient compression, and rendering surface quality of the moldings to be excellent.

According to a second feature of the present invention, therefore, a resin-coating process in which a space is defined by one mold of stationary type and the other mold of a type movable with respect to the one mold, a resin molding is formed with a mold material compression-molded within this space, thereafter a resin coating material is injected onto a surface of the molding, and a resin coating layer is formed by performing again the compression molding, is constituted to compress outer surface of the molding with a fluid injected from an injecting port provided to the molding after the re-compression molding.

Next, in the present invention, there is provided a resin-coating apparatus which can perform in smooth manner a retraction of a plug member from a coating-material injecting member without causing the coating-material injecting member and plug member to engage with either one of split upper and lower molds and without causing tip end portions of these coating-material injecting member and plug member to be crushed, and further can perform the molding in excellent manner without hindrance to the injection of the fluid coating material.

According to a third feature of the present invention, therefore, a resin-coating apparatus for forming a resin coating layer on one side surface of a resin molding molded with split upper and lower molds employed, is constituted by an injecting member for the coating material having therein an injecting hole for the coating material and opened at a tip end, the injecting member being provided in one of the molds, an auxiliary mold provided in the other mold to face the injecting member for the coating material but not to engage with the opened tip end of the injecting hole for the coating material, and a plug member provided within the injecting hole to penetrate therethrough for forward and backward movement.

Further in the present invention, there is provided a resin-coating apparatus which can prevent the fluid coating material from intruding to a surface on the side where the resin coating layer to be formed on the molding is not required, and can injecting the fluid coating material exclusively only to a surface which requires the resin coating layer.

According to a fourth feature of the present invention, therefore, a resin-coating apparatus in which moldings are formed with split molds in one of which a nozzle for injecting a fluid coating material is formed, and a resin coating layer is formed between the opposite side surface and the other surface with the fluid coating material injected from the injecting nozzle and supplied penetratingly through the molding to its opposite side surface, is constituted by a groove or projection provided on a surface of the one mold having the injecting nozzle to externally enclose the position of this injecting nozzle.

In the present invention, next, there is provided a resin-coating apparatus which does not hinder the nozzle mechanism for injecting the fluid coating material, so as to attain a stable and highly efficient production with an excellent surface quality.

According to a fifth feature of the present invention, therefore, a resin-coating apparatus which forms moldings with the molding material of thermosetting resin pressure-molded between a pair of split, upper and lower molds of stationary and movable types, defines a space between either one of the molds of the stationary or movable type and the molding with the movable type mold moved prior to a complete curing of the molding, and then forms the resin coating layer on one side surface of the resin molding with the fluid coating material injected into the space, pressurized again and cured, is constituted by an air ejecting air-nozzle mechanism provided for being opened and closed in the mold on the side contacting with the fluid coating material injected, which air-nozzle mechanism comprising a cylinder having a valve seat and movable toward and away from the space and an air valve movable independently forward and backward within the cylinder, so that an air nozzle will be released when the resin molding is to be urged against the other mold with air ejected and will be closed after completion of this urging action.

In the present invention, next, there is provided a resin-coating apparatus capable of controlling a leaking amount of the coating material out of shear edge to be proper, so as to be able to check the leakage of the coating material to the exterior of the molds and to shorten required time for cleaning the molds after the molding.

According to a sixth feature of the present invention, therefore, a resin-coating apparatus for forming the resin coating layer with the fluid coating material injected onto one side surface of the molding molded with the split upper and lower molds is constituted by forming the shear edge at a side edge part of the split mold in two stages of inside shear edge and outside shear edge, and rendering preferably a space between the molds at their outside shear edges to be smaller than that at their inside shear edges.

In the present invention, next, there is provided a resin molding, that is, a thermosetting molding material which allows an in-mold coated molded product excellent in the adhesion with respect to the coating material to be obtained.

According to a seventh feature of the present invention, therefore, the molding material for performing the in-mold coating is comprises a thermosetting resin, a radical polymerization initiator, a filler and a curing retarder. As the curing retarder, in this event, a preferable one should be any of molding materials containing SH group of carbon number 5 to 20; one or more molding material selected from the group consisting of α-methylstyrene, stilbene, 4-phenoxy styrene, cumene and 4-methyl-2,4-diphenyl-pentene-1; and monoterpene hydrocarbon.

In the present invention, further, there is provided a resin molded product, in particular, a bathtub, which is capable of attaining a reduction of cost with an amount of use of the coating material reduced as much as possible, improving such horizontal surface part as a flange part, a bottom surface part of main body or the like in the resistance properties, and presenting a profundity in the appearance.

According to an eighth feature of the present invention, therefore, the bathtub as the resin molded product is constituted by forming the resin coating layer on the surface of the molding having at least a flange part, main-body bottom surface part, extended flange part, corner parts and slope parts between the corner parts, and rendering the thickness of the resin coating layer at such horizontal plane parts as the flange, bottom surface and the like parts to be larger than that of other parts.

Other objects and advantages of the present invention shall be made clear in the following description detailed with reference to embodiments shown in accompanting drawings.

BEST MODE FOR WORKING THE INVENTION

Figure 12:
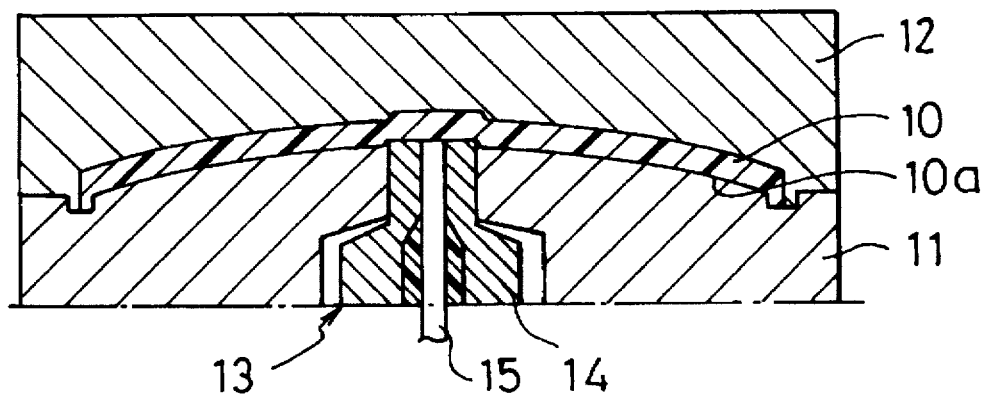
FIGS. 12 and 13 are respectively sectioned views at a main part of an apparatus employed in a resin-coating process according to the present invention of FIGS. 1 through 11.
Figure 13:
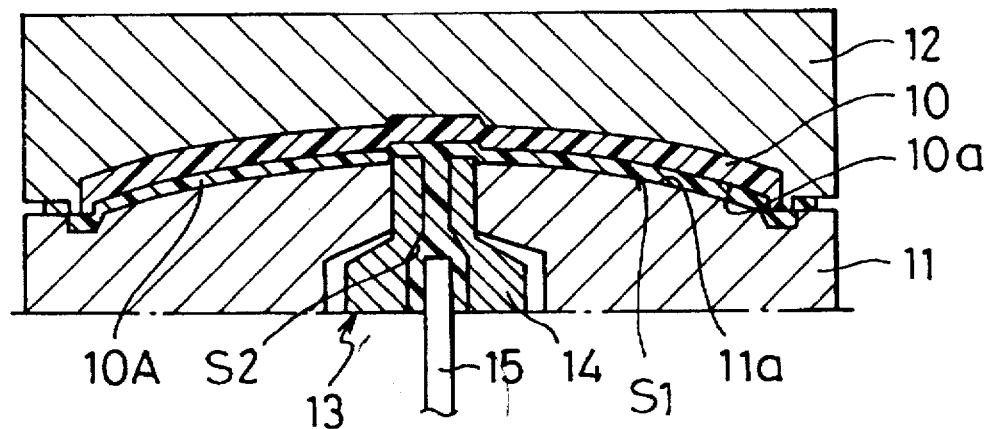

Referring to FIGS. 1 through 11, there are shown fragmentary sectioned views showing the concept of typical apparatus for working the process of the present invention, and FIGS. 12 and 13 are conceptual diagrams of the step of injecting the fluid coating material. While in the apparatus in the embodiment as shown an upper mold or female mold section 12 as a second mold is made movable with respect to a lower mold 11 as a first mold and the lower mold 11 is provided substantially in the center with an injecting means 13 for the coating material (which shall be also referred to hereinafter simply as an injecting member 13), it is also possible to modify the design so that, inversely, the upper mold 12 will be stationary with the lower mold 11 made movable, and the upper mold 12 is provided substantially in the center with the injecting member 13. The molds 12, 11 are separable and joinable along a clamping direction A. The mold surface of the upper mold forms an outer peripheral surface region 12P. The mold surface of the lower mold forms an outer peripheral surface region 11P. When the molds are closed, the outer peripheral surface regions, which are tapered relative to the direction A, face one another.

Referring also to FIGS. 12 and 13 here, the injecting member 13 is provided with a casing 14 opened at a tip end, and internally with a hole forming means 15 to be movable forward and backward, penetrating through the casing 14. Upon injection of the coating material, the upper mold 12 is raised to lift a molding 10, following the upper mold 12, so that a space S1 will be formed below the molding, that is, between the molding and the lower mold 11. At the same time, the hole forming means 15 is moved backward in lower direction to form a space S2 within the casing 14. As the fluid coating material is injected in this state, the coating material is made to fill between the front side surface, that is, top surface 11a of the lower mold 11 and lower surface 10a of the molding 10, a uniform resin coating layer 10A can be thereby formed on lower side of the molding 10, upon which the arrangement is so made that the resin coating layer 10A can be effectively prevented from expanding to upper side of the molding 10. Further, the injecting member 13 is provided with an injecting pump 16 for the injection of the fluid coating material and with an air pump 17.

Figure 1:
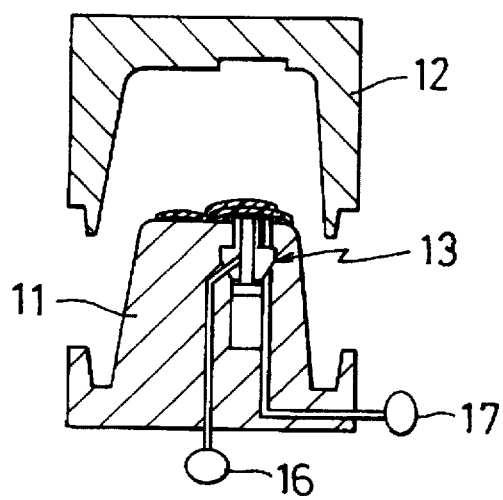
FIGS. 1 through 11 are explanatory views respectively for the steps in one embodiment of the resin-coating process according to the present invention.
Figure 2:
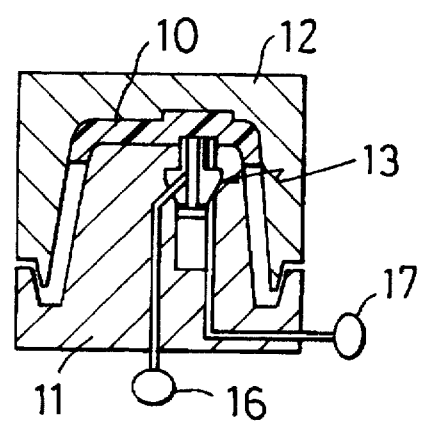
Figure 3:
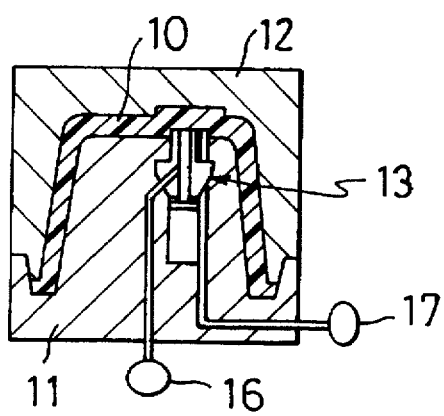
Figure 4:
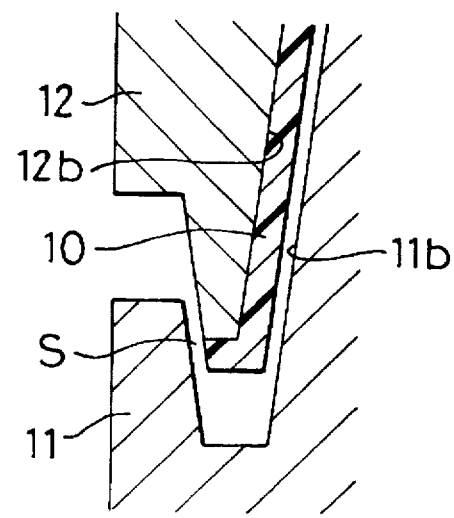
Figure 5:
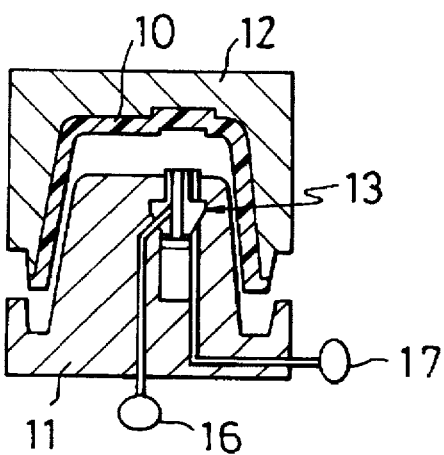
Figure 6:
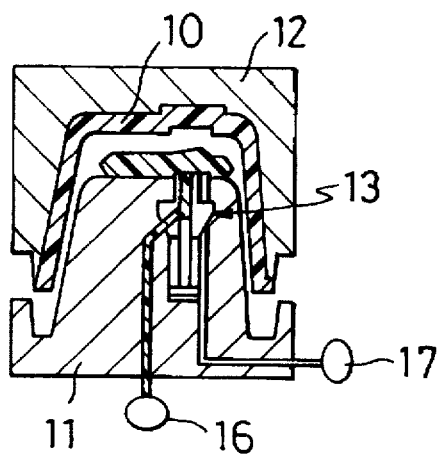
Figure 7:
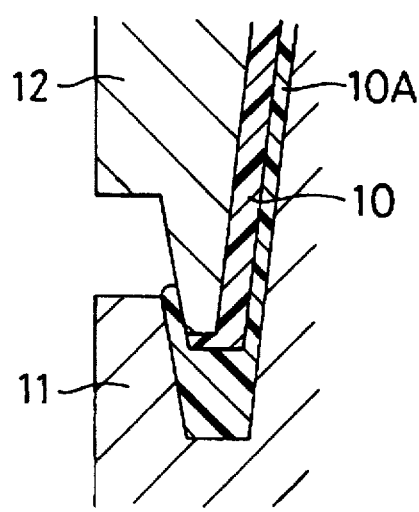

Referring next to the manufacturing process for the resin molding according to the present invention with the foregoing resin-coating apparatus employed, such molding material as BMC, SMC or the like is first supplied with respect to the lower mold 11 in a state where the upper mold 12 is opened as shown in FIG. 1 to form a first space with the lower mold. Next, as shown in FIG. 2, the upper mold 12 is gradually lowered and brought into such mold clamping state as in FIG. 3, and a curing reaction of the molding material is advanced, by a heating step. At this time, the pressurizing is ceased before a complete curing is reached, and the upper mold 12 is raised slightly with respect to the lower mold 11 as shown in FIG. 4. In order to attain smooth sliding engagement between the lower and upper molds 11 and 12, they are provided with tapers 11b and 12b. Between these tapers 11b and 12b, a second space S is formed, the air pump 17 blows a compressed air as shown in FIG. 5 to cause an air stream to occur in the space S between the molding 10 which is half cured and the lower mold 11, and any molding-flash or dust present in the space S are blown off from the upper and lower molds. Thereafter, as shown in FIGS. 6 and 7, the fluid coating material is injected. Provided in this case that the coating material is injected at an enough amount for slightly overflowing from the space S as shown in FIG. 7, in particular, any molding-flash and dust remained even after sweep action by the air stream can be completely discharged from the space S and, in addition, the resin coating layer 10A can be formed all over the molding.

Figure 8:
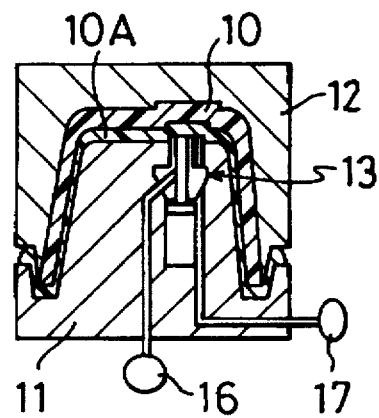
Figure 9:
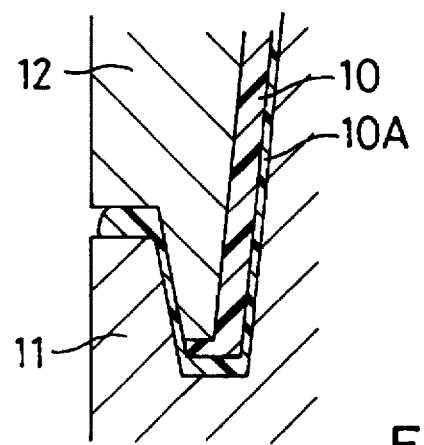
Figure 10:
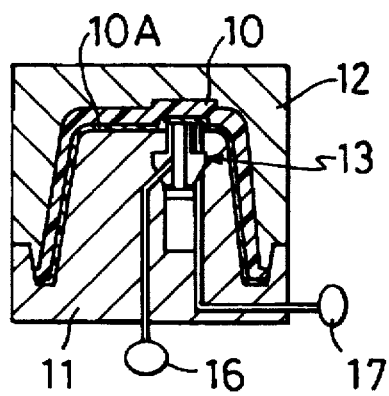
Figure 11:
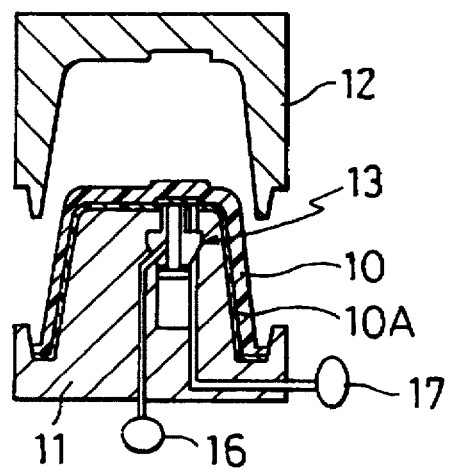

Then, the molds are clamped as shown in FIGS. 8 and 9, whereby the resin coating layer 10A can be formed in all parts of the molding 10 as shown, in particular, in FIG. 9. Preferably, the pressurized heating is carried out finally, that is, a secondary heating is performed as shown in FIG. 10, and the molds are opened to release the resin molding from the upper and lower molds.

While the manufacturing process according to the present invention should preferably be arranged as in the foregoings, it is possible to adopt various equivalents and substitutions. For example, while it has been described that the molds are clamped again after termination of the injection of the fluid coating material, it is possible to clamp the molds again during the injection of the fluid coating material in an event where a material of a short gel time is selected as the fluid coating material, in which case the molding cycle can be remarkably shortened to be contributive to an improvement in the productivity, as will be appreciated.

Figure 14:
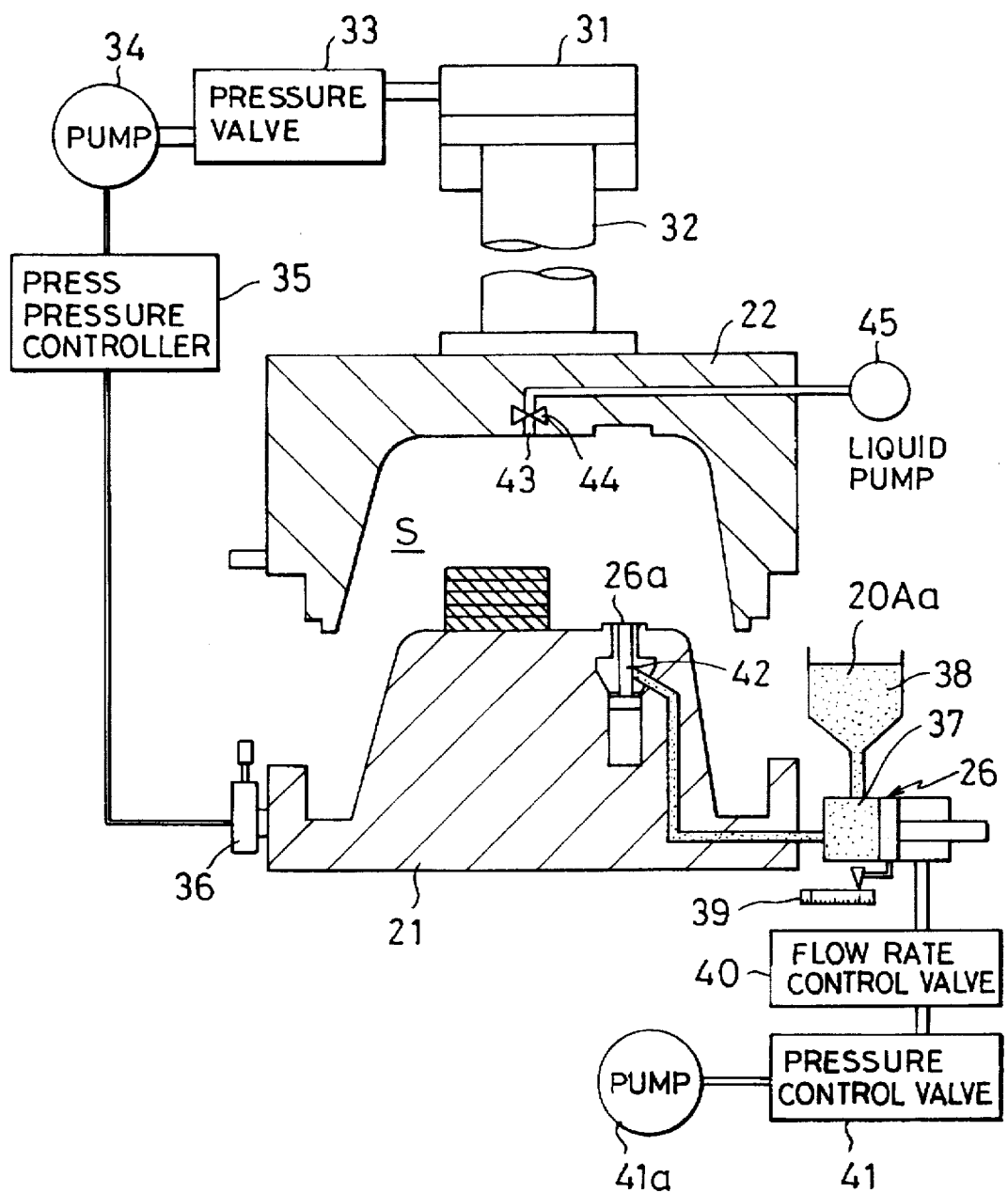
FIG. 14 is an explanatory view for a resin-coating apparatus employed in another embodiment of the manufacturing process according to the present invention.

In FIG. 14, there is shown an apparatus for practicing the resin-coating process according to a second feature of the present invention, and in FIGS. 15 to 23 the steps of this process are shown.

This resin-coating apparatus comprises the lower and upper molds 21 and 22, the lower mold 21 is provided on stationary side while the upper mold 22 is made on movable side, and the upper mold 22 is arranged for movement in upward and downward direction on the drawing by means of such cylinder device 31 as an oil pressure cylinder. To this cylinder device 31, a press ram 32, pressure control valve 33, pump 34, press pressure controller 35 and mold-displacement meter 36 are linked. Further, the lower mold 21 is provided with an injecting port 26a for the coating material, so as to be able to inject the coating material 20Aa as a molding resin for forming the resin coating layer 20A through the injecting port 26a for the coating material by means of a coating material supply device 26 including an injection cylinder 37. The coating material supply device 26 comprises a tank 38, a detector 39 for the stroke of the injection cylinder 37, a flow rate control valve 40, a pressure control valve 41 and a pump 41a. Further, the injecting port 26a for the coating material is provided with an opening and closing valve 42. On the other hand, the upper mold 22 is provided with an injecting port 43, so that a fluid supplied through a fluid control valve 44 from a fluid pump 45 can be discharged out of the injecting port 43.

Figure 15:
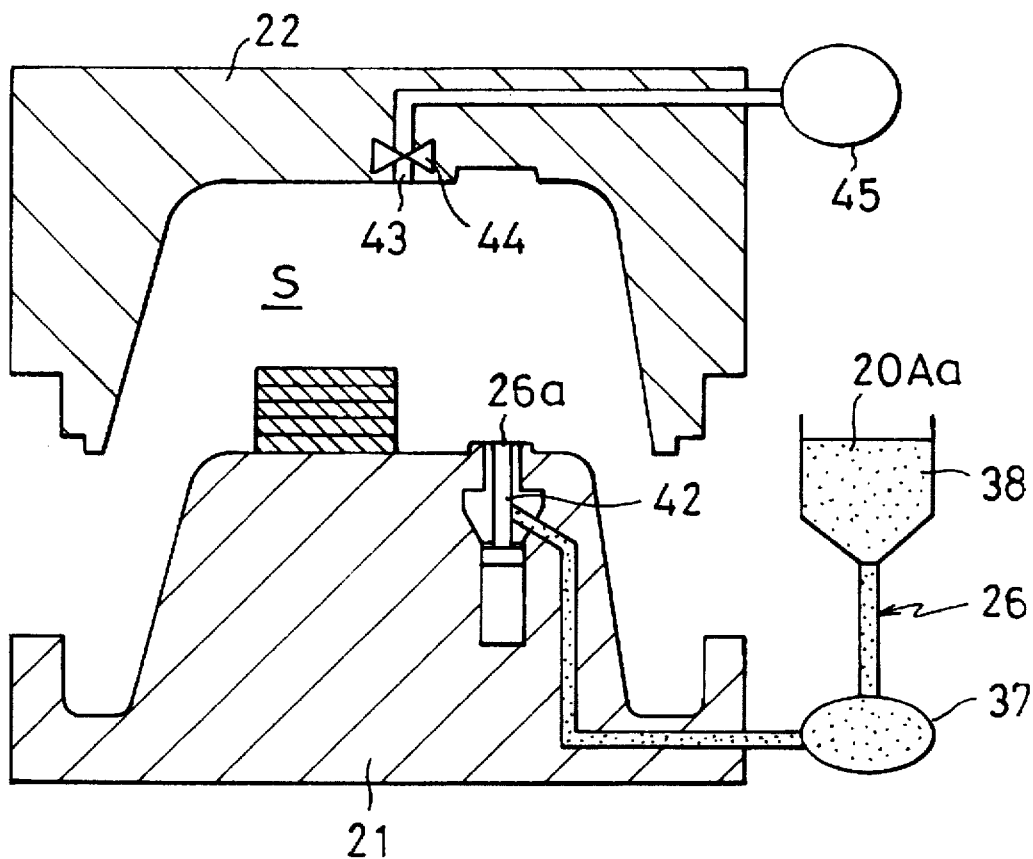
FIGS. 15 through 23 are explanatory views for manufacturing steps of the present invention in the apparatus shown in FIG. 14.
Figure 16:
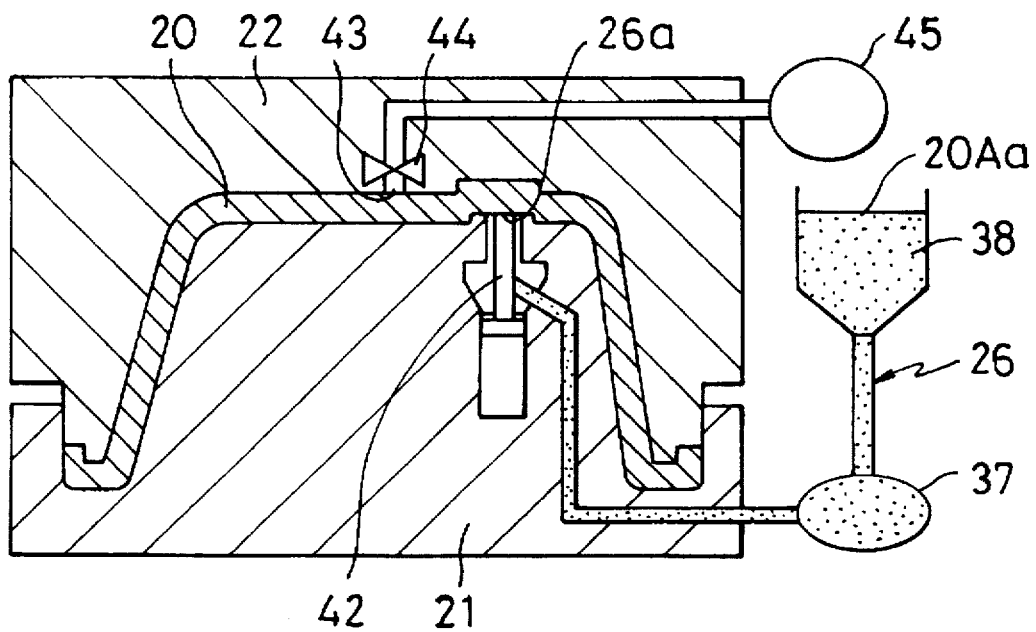
Figure 17:
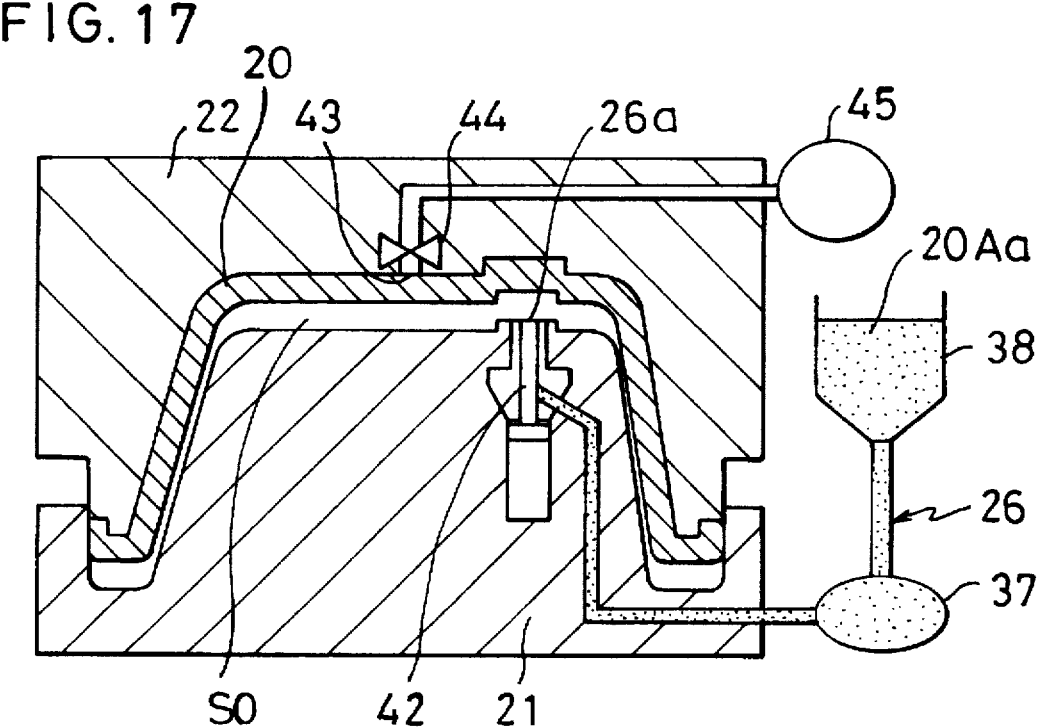
Figure 18:
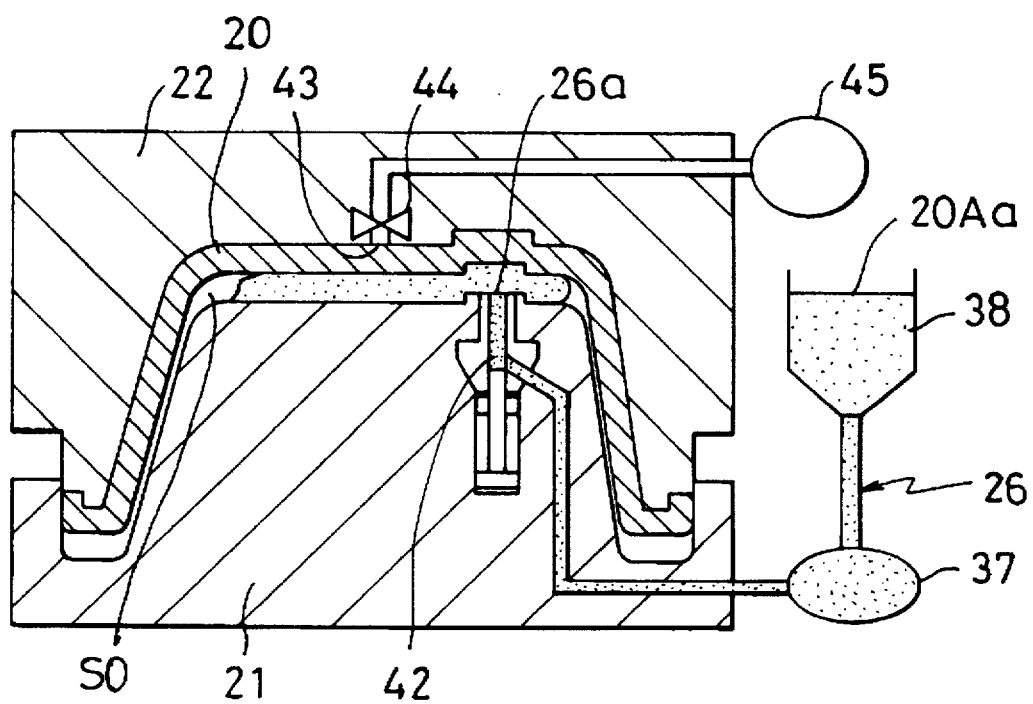
Figure 19:
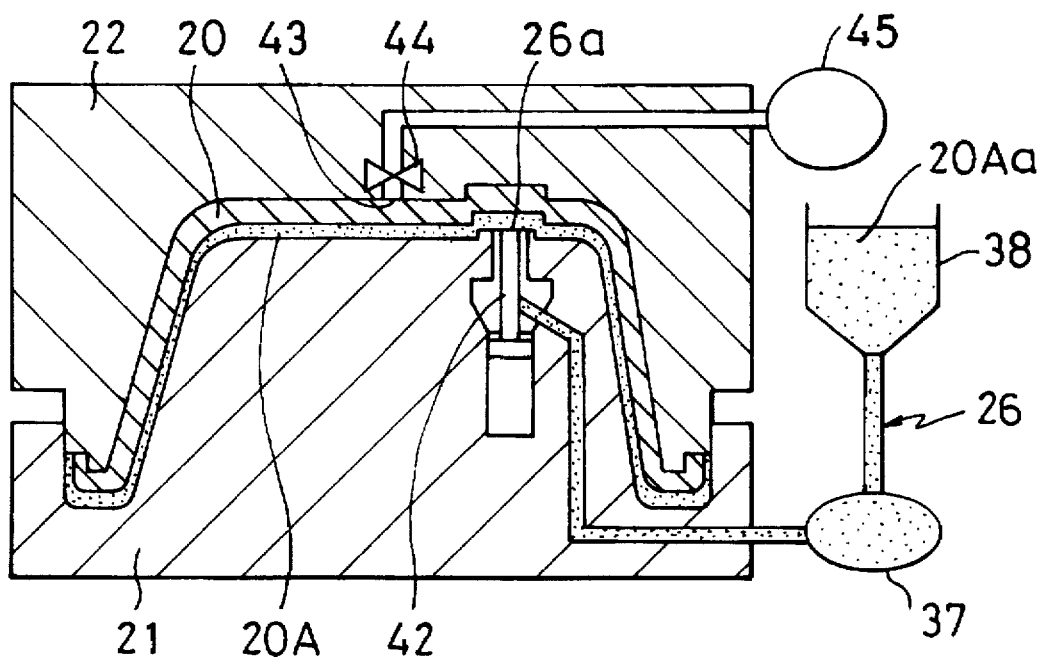
Figure 20:
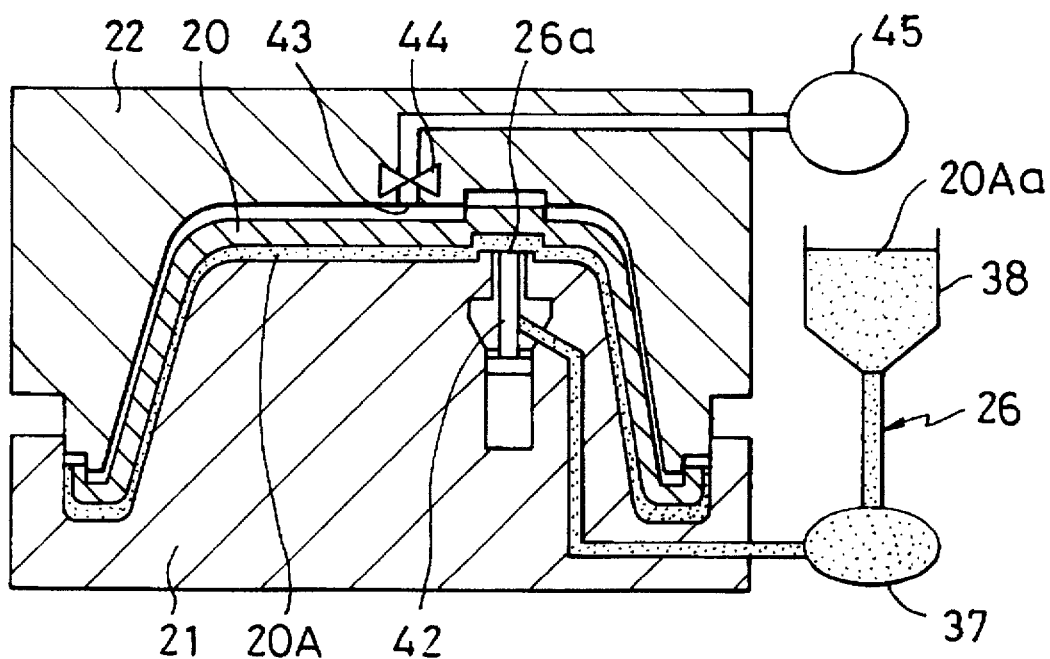
Figure 21:
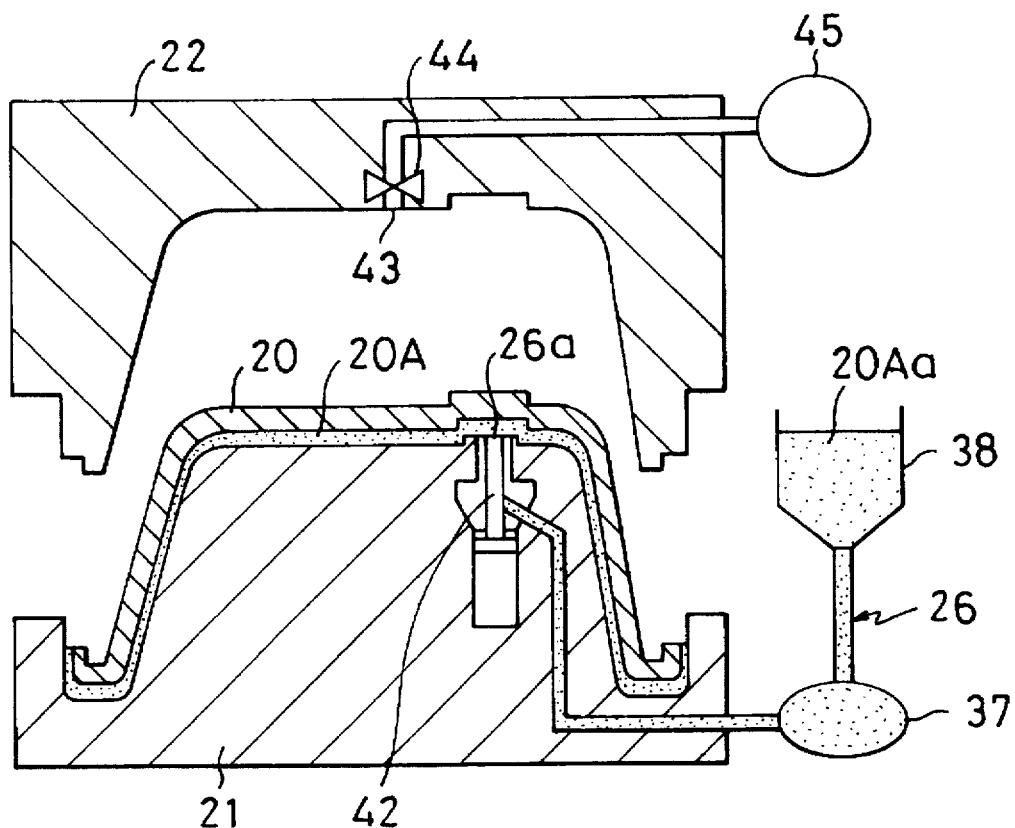
Figure 22:
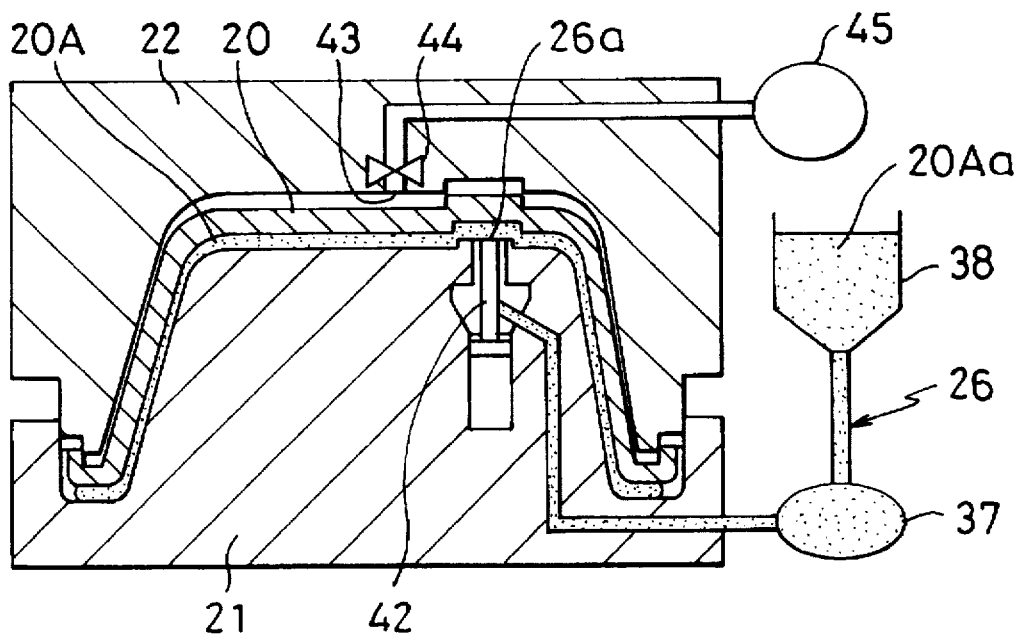
Figure 23:
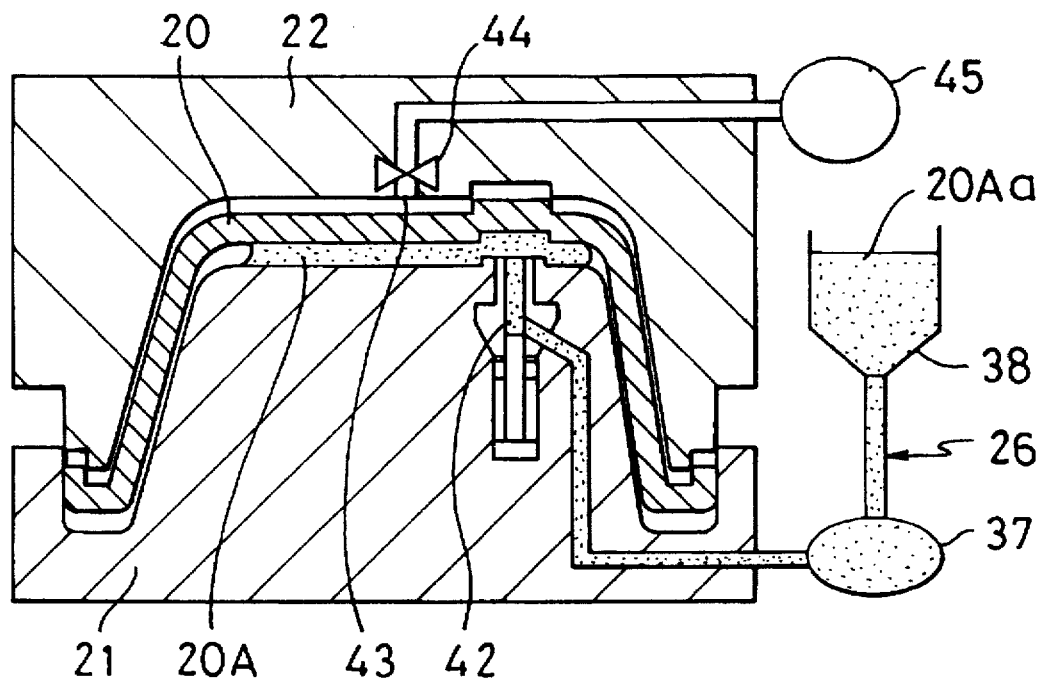

Now, in manufacturing the resin molded product having the resin coating layer 20A on the molding 20 with the foregoing resin-coating apparatus employed, following steps are executed. That is, the upper mold 22 is first lifted up to form the space S, as shown in FIG. 15 and, in this state, the molding material as a material for the resin molding 20 is placed on the lower mold 21. For the molding material, a thermosetting resin reinforced by glass fibers is employed, and BMC (bulk molding material), SMC (sheet molding material) or the like of unsaturated polyester resin or the like blended with such filler as calcium carbonate, aluminum hydroxide or the like, a hardener, such fibrous reinforcement as glass fibers, carbon fibers or the like, and, as required, a thickening agent, colorant or the like is placed on the lower mold 21. Next, as in FIG. 16, the upper mold 22 is lowered and subjected to the mold clamping, the molding material is heated and compressed, and the molding 20 is formed. Next, the upper mold 22 as well as the molding are slightly moved upward so as to define a slight gap S0 between a surface of the molding 20 and the lower mold 21 as in FIG. 17, and, as in FIG. 18, next, the valve 42 is opened to inject the coating material 20Aa consisting of a resin of unsaturated polyesters, vinyl esters, epoxies, acrylics or the like or a mixture resin of them, by means of the coating material supply device 26 through the injecting port 26a for the coating material into the slight gap S0 between the front side surface of the molding 20 and the lower mold 21. When the injection of the coating material 20Aa is completed, the valve 42 is closed, the upper mold 22 is also lowered, and the re-compression mold is carried out, as in FIG. 19. After the re-compression mold, the fluid control valve 44 is opened, the fluid is injected from the fluid pump 45 through the injecting port 43, and a pressure is applied to an outer surface of the molding 20, as in FIG. 20. Referring to the fluid employed here, such gaseous member as nitrogen gas, carbon dioxide gas, air or the like or such liquid member as a thermosetting resin of low viscosity, water, oil, alcohol or the like may be employed. In this case, fundamentally, it is optimum to select one which gives no influence on the molding 20 and, in particular, one which does not require such post-treatment as washing or the like. Further, it is desirable that such inert gas as nitrogen gas, carbon dioxide or the like will have a pressure of about 150 Kg/cm$^2$.

With such pressure application to the resin molding by means of the fluid, it is made possible to uniformly pressurize not only flat parts of the molding but also any sloped parts, peripheral parts or the like even when the molding has an uneven surface, and to uniformly bond at all parts the coating material 20Aa to the molding 20 which constitutes a main body of the resin molded product. Thereafter, the fluid control valve 44 is closed, the upper mold 22 is lifted up as in FIG. 21 for the mold opening, and in this state the resin mold product completed is released. In the embodiment shown in FIGS. 14 to 21, the bathtub is shown as an example of the resin molded product. In the bathtub manufactured here, the resin coating layer 20A can be adhered with a uniform adhesion to the surface of the molding 20 as the main body. In the foregoing manufacture of the bathtub, on the other hand, the upper and lower molds are made to have a temperature of 140 C.

Referring next to another embodiment of the present invention, the resin coating material 20Aa is injected at the time of the re-compression molding, and then the fluid is injected from the injecting port 43 provided in the upper mold to apply a pressure to the outer surface of the molding 20. That is, in this embodiment, the same steps as those of FIG. 15 to FIG. 18 in the foregoing embodiment are taken but, after the injecting step of the coating material 20Aa as in FIG. 18, the fluid control valve 44 is opened immediately so that the fluid supplied from the fluid pump 45 will be injected from the injecting port 43 to compress the outer surface of the molding 20. In other words, in the present embodiment, the steps of FIGS. 19 and 20 in the foregoing embodiment are replaced by the step of FIG. 22. Accordingly, in the present arrangement, the re-compression molding for forming the resin coating layer 20A can be effectively carried out by means of the pressure feeding of the fluid, and the molding time can be shortened in contrast to the foregoing embodiment. Further, with the practice of the re-compression molding by means of the pressure feeding of the fluid, a uniform pressure of the fluid is made to be applied to all parts of the outer surface made uneven of the molding 20 even in the case of the molding 20 in which an unevenness remains, and a sufficient compression molding pressure can be provided.

In still another working aspect of the present invention, the arrangement is so made that, upon injecting the coating material 20Aa, the fluid is injected from the injecting port 43 made in the upper mold 22 so as to compress the outer surface of the molding 20. That is, in the present embodiment, the fluid is injected simultaneously with the injection of the coating material 20Aa, and the re-compression molding for forming the resin coating layer 20A is performed by this injection of the fluid. According to this arrangement, the molding time can be further shortened in contrast to the foregoing embodiments, and an excellent compression molding can be realized with a uniform compression force given to uneven outer surface of the molding 20.

Figure 24:
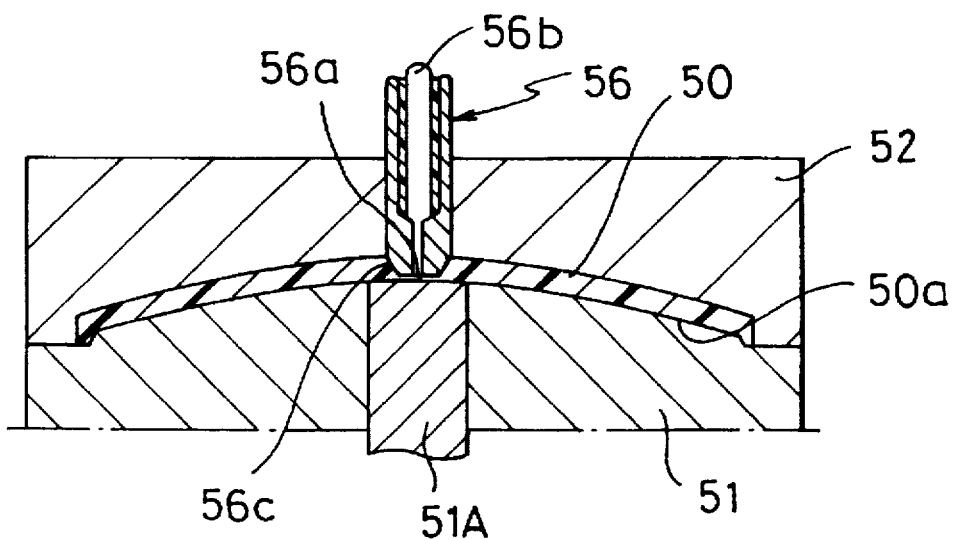
FIG. 24 is a fragmentary sectioned view at the time of clamping the molds in another embodiment of the resin-coating apparatus according to the present invention.
Figure 25:
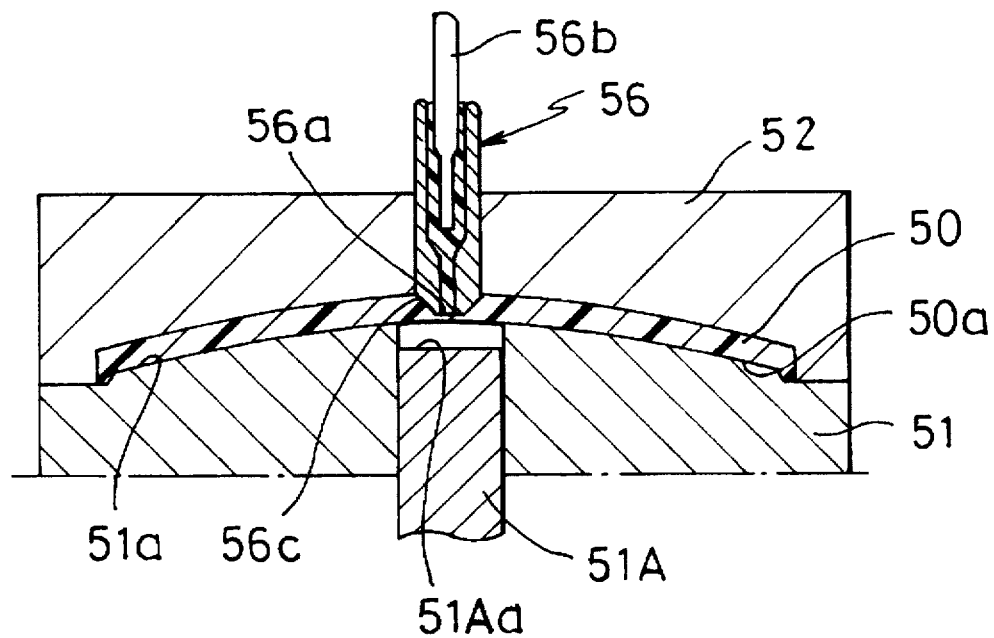
FIG. 25 is a fragmentary sectioned view showing a state in which an auxiliary mold is retracted from a state of FIG. 24 in the apparatus of FIG. 24.

Referring to FIGS. 24 and 25, there is shown an embodiment of the resin-coating apparatus according to a third feature of the present invention, in which apparatus the arrangement is so made that a mold comprising lower mold 51 and upper mold 52, and the resin coating layer 50A can be formed on the side of lower surface 50a of the molding 50 molded between both of the molds.

The above referred upper mold 52 is provided with a coating material supply device 56 having therein the injecting port 56a for the coating material and opened at its forward tip end which is projected into the molding 50. Further, the lower mold 51 is provided therein with an auxiliary mold 51A made to face the coating material supply device 56 but not to contact with the open tip end of the injecting port 56a. Within the injecting port 56a of the coating material supply device 56, there is provided a plug member 56b movable forward and backward penetratingly through the injection port 56a. At this time, the plug member 56b is elongated to penetrate through the coating material supply device 56 but not to engage at its tip end with the auxiliary mold 51A.

The above auxiliary mold 51A is provided within a through hole 57 made in the lower mold 51 to be movable forward and backward. Further, tip end portion 56c of the coating material supply device 56 is tapered for engagement with the molding 50.

Figure 26:
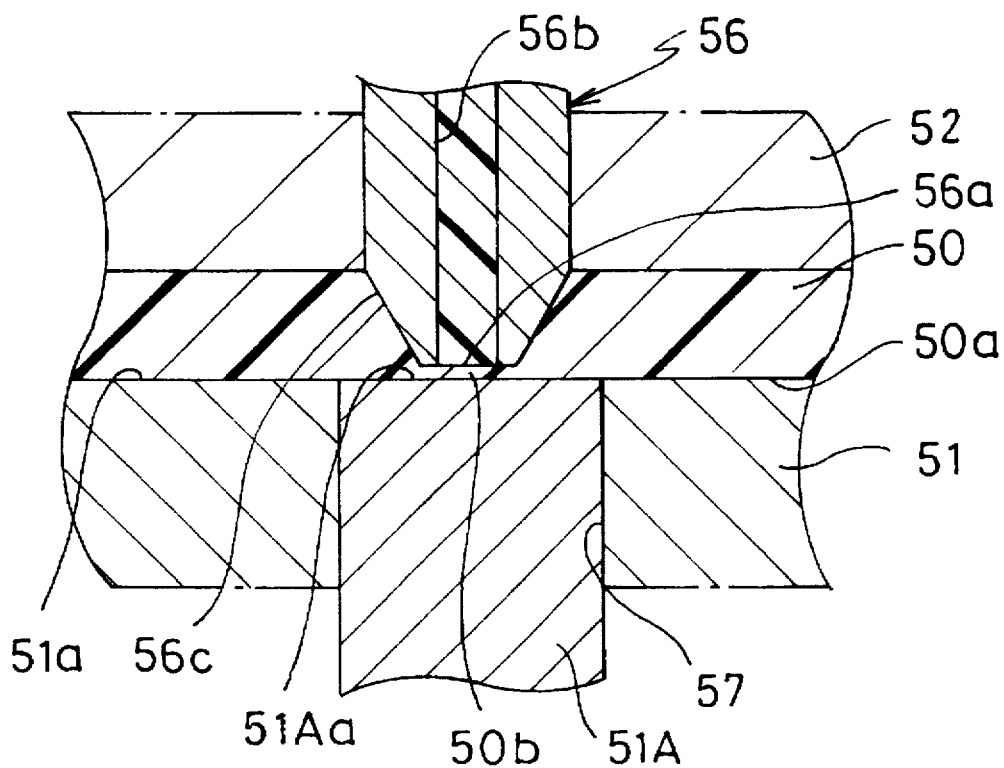
FIGS. 26 through 34 are respectively fragmentary sectioned views as magnified of the apparatus of FIG. 24 showing respectively different operating states.

Referring in the followings to the operation of the resin-coating apparatus according to the present invention in detail, such molding material as SMC or the like is first placed between the lower and upper molds 51 and 52 in the state where they are opened. At this time, as shown in FIGS. 24 and 26, a top surface 51Aa of the auxiliary mold 51A is positioned to be substantially flush with upper surface 51a of the lower mold 51, the tip end portion 56c of the coating material supply device 56 is positioned not to contact with but close to the auxiliary mold 51A, and the molding 50 is formed with the lower and upper molds 51 and 52 clamped. At this time, a thin layer part 50b is formed in the molding 50, between the tip end portion 56c of the coating material supply device 56 and the top surface 51Aa of the auxiliary mold 51A.

Figure 27:
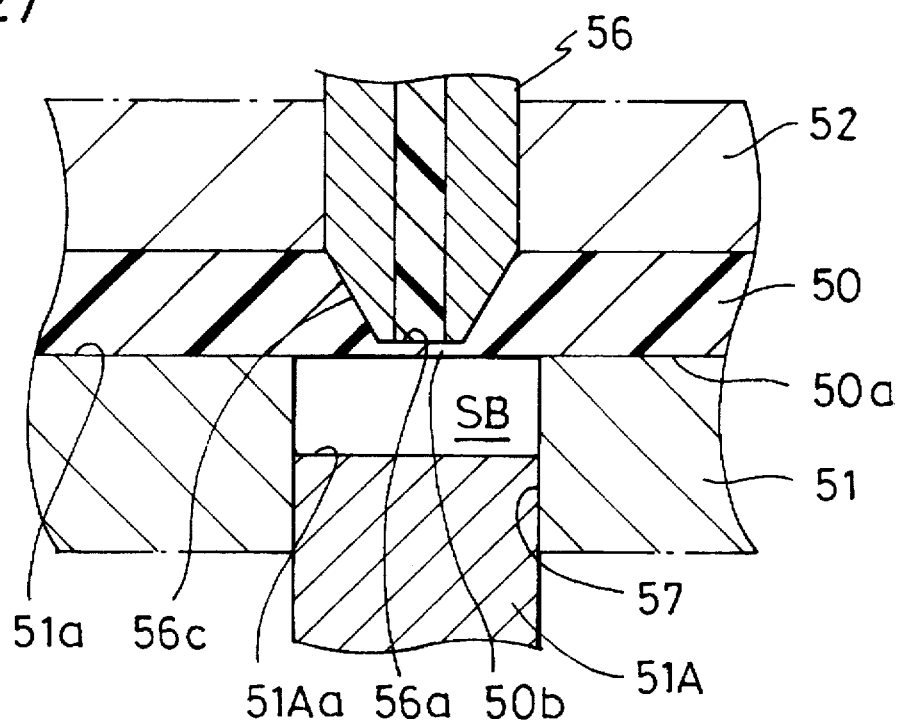

Next, the clamping pressure for the lower and upper molds 51 and 52 is reduced, the auxiliary mold 51A is moved backward to form a space SB, as shown in FIGS. 25 and 27, the plug member 56b is moved backward in upward direction, and the coating material is injected under a predetermined pressure from the injecting port 56a of the coating material supply device 56. Accompanying this, therefore, the thin layer part of the molding 50 is broken by the injecting pressure of the coating material, as shown in FIG. 28, and the coating material is injected from this part to form the resin coating layer 50A between the bottom surface 50a of the molding 50 and the upper surface of the lower mold 51A.

Figure 28:
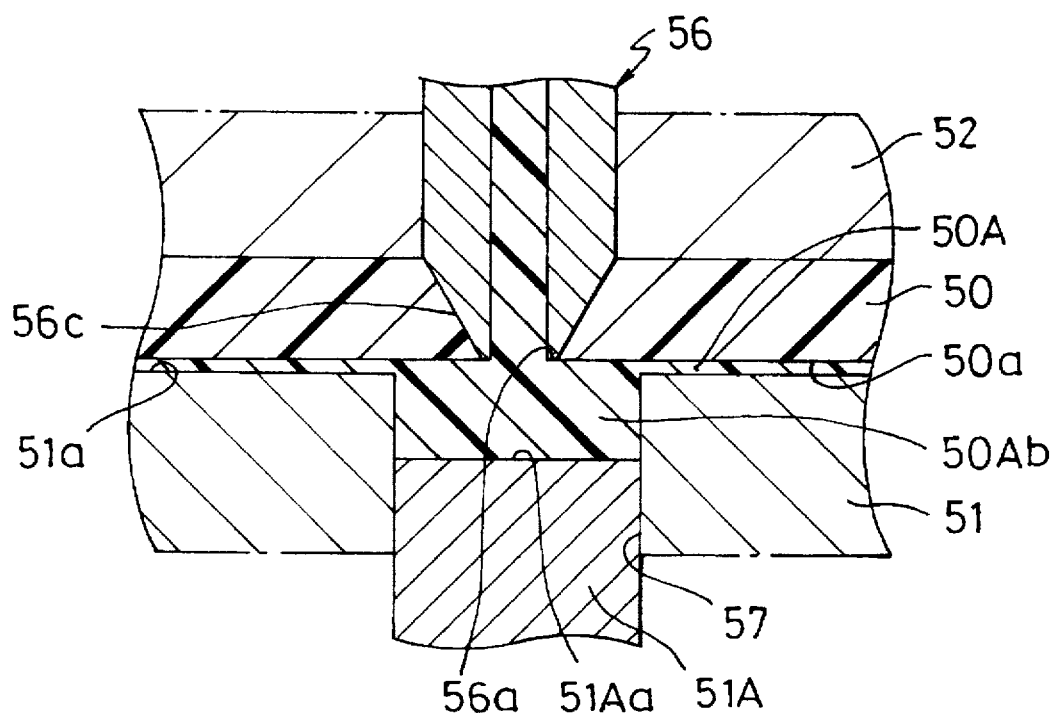

As shown in FIG. 28, by the way, there is provided a part 50Ab corresponding to a thickened part at one position, so that, in an event when the bathtub or the like, for example, is to be manufactured, this part corresponding to the thickened part is cut off at a subsequent step so as to form an exhaust port or the like.

Since, as described in the above, the auxiliary mold 51A provided in the lower mold 51 faces the coating material supply device 56 but is not in contact with the open tip end of the injecting port 56a of this coating material supply device 56, the tip end portion 56c of the coating material supply device 56 can be prevented from being crashed at the time of molding the molding material with the molds clamped for forming the molding 50.

Accompanying to the above, the backward movement and later forward movement of the plug member 56b of the coating material supply device 56 can be attained in smooth manner, and the operation can be made useful. Further, since the coating material can be injected with the auxiliary mold 51A moved backward and the coating material is caused to be once injected into the space SB occurring behind the auxiliary mold 51A moved backward and thereafter along the bottom surface 50a of the molding 50, the injection of the coating material can be performed in smooth manner.

Further, since the tip end portion 56c of the coating material supply device 56 is formed as tapered, this tip end portion 56c of the coating material supply device 56 can be easily inserted into the molding 50. At the same time, contacting surface of the molding 50 is urged against contacting part of the coating material supply device by the pressure of the coating material injected, and the coating material can be prevented from intruding to top surface side of the molding 50.

Figure 29:
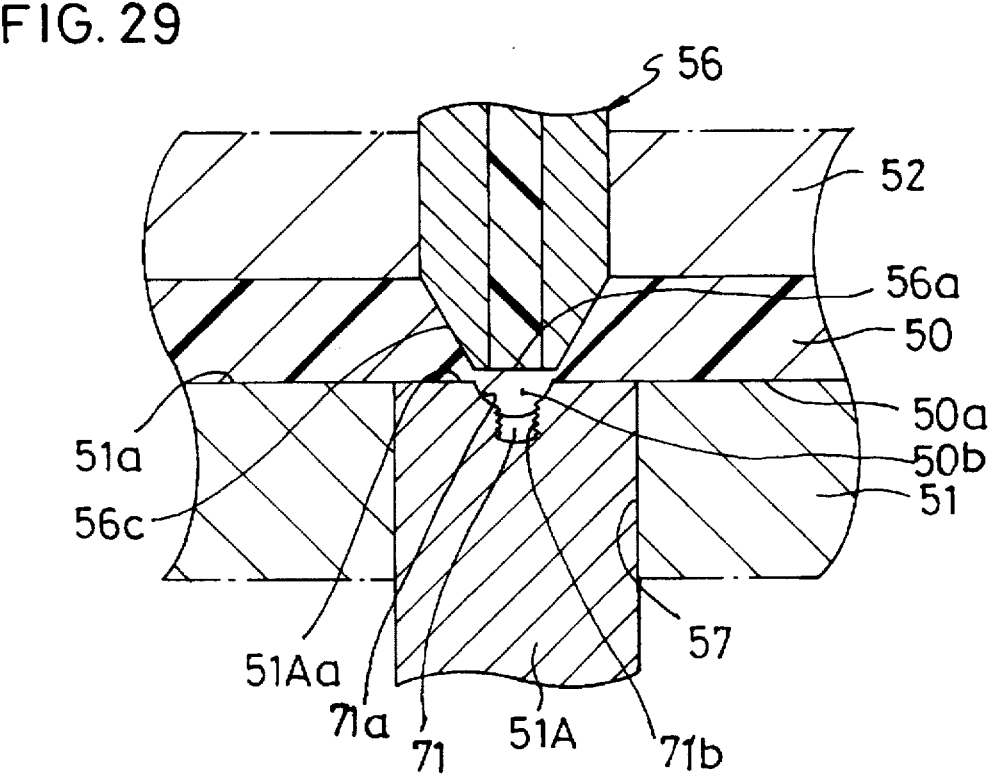
Figure 30:
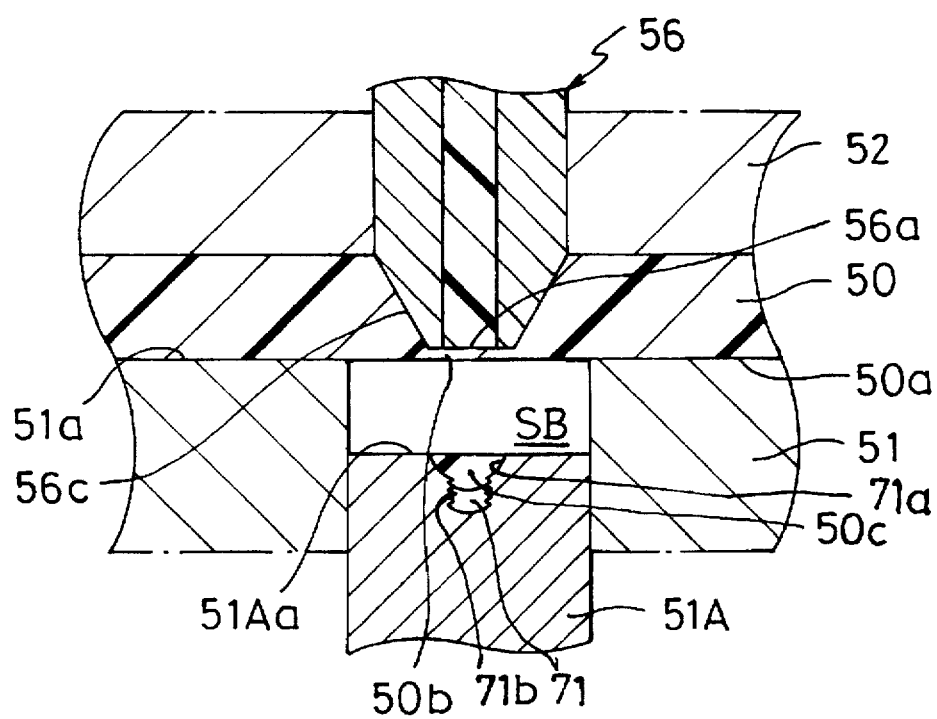
Figure 31:
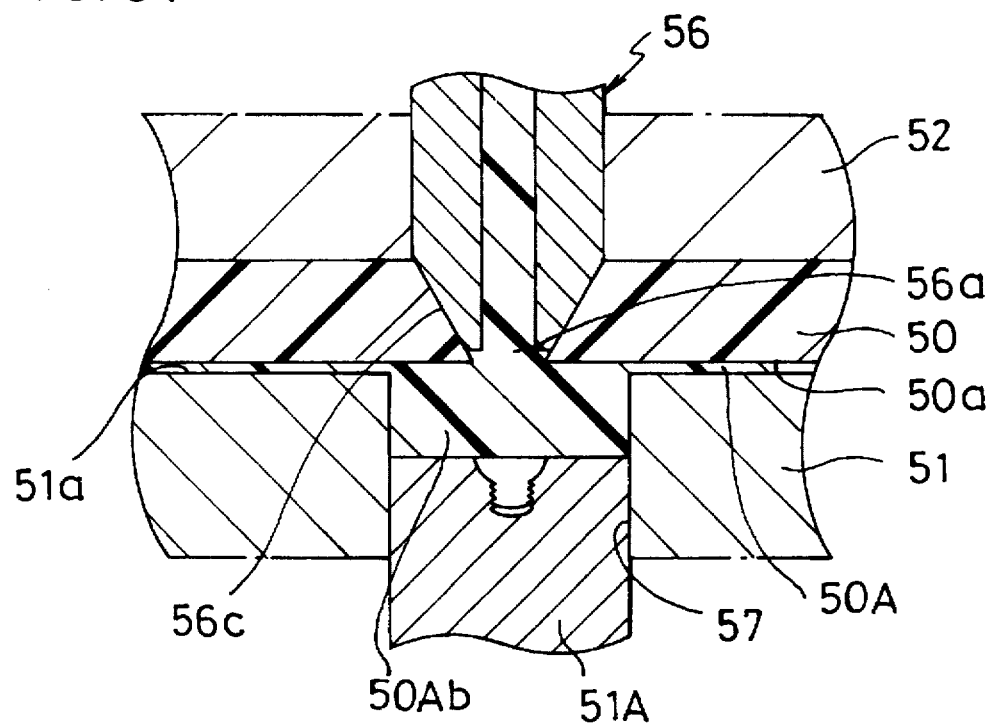

Referring now to FIGS. 29 to 31 of another working aspect of the resin-coating apparatus in the third feature of the present invention, in which, in addition to the foregoing working aspect of FIGS. 24–28, the auxiliary mold 51A is provided with a recessed part 71 into which a broken portion of the thin layer part 50b is allowed to enter, at the time when the coating material injected from the injecting port 56a of the coating material supply device 56 breakes the thin layer part 50b of the molding 50 and enters along the bottom surface 50a of the molding 50.

The recessed part 71 is formed with a surface recess 71a of an arcuate shape in section and a female threaded portion 71b continuing to the surface recess 71a. Therefore, as shown in FIG. 29, the portion 50c of the molding 50 enters into this recessed part 71 upon clamping of the lower and upper molds 21 and 22. As shown in FIG. 30, further, the backward movement of the auxiliary mold 51A causes the portion 50c in the recessed part 71 to be separated and moved backward together with the recessed part 71.

Next, as the coating material is injected, as shown in FIG. 31, the thin layer part 50b of the molding is broken and separated by the injecting pressure, so as to be put into the recessed part 71, whereby this thin layer part 50b is prevented from remaining in the coating material injected along the bottom surface 50a of the molding 50.

Figure 32:
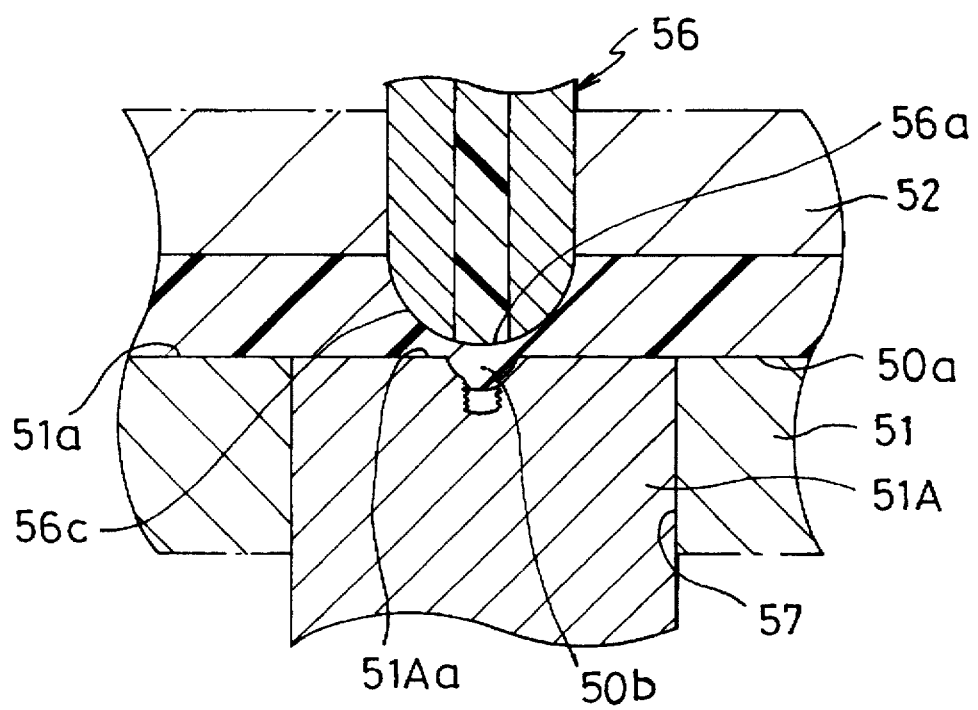
Figure 33:
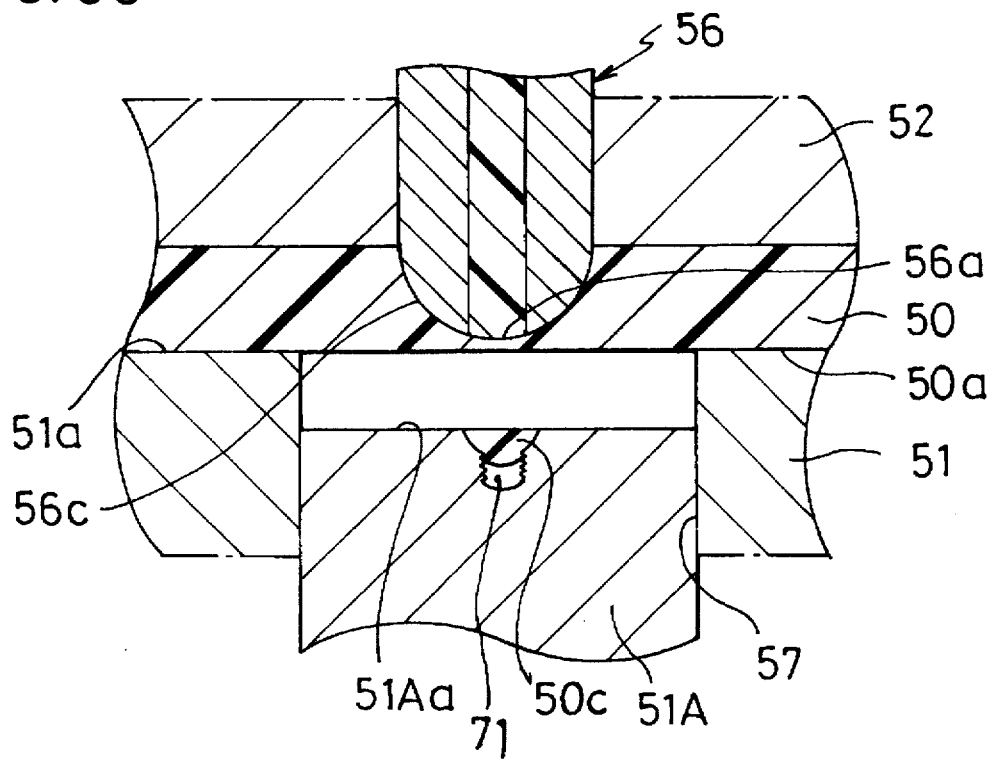
Figure 34:
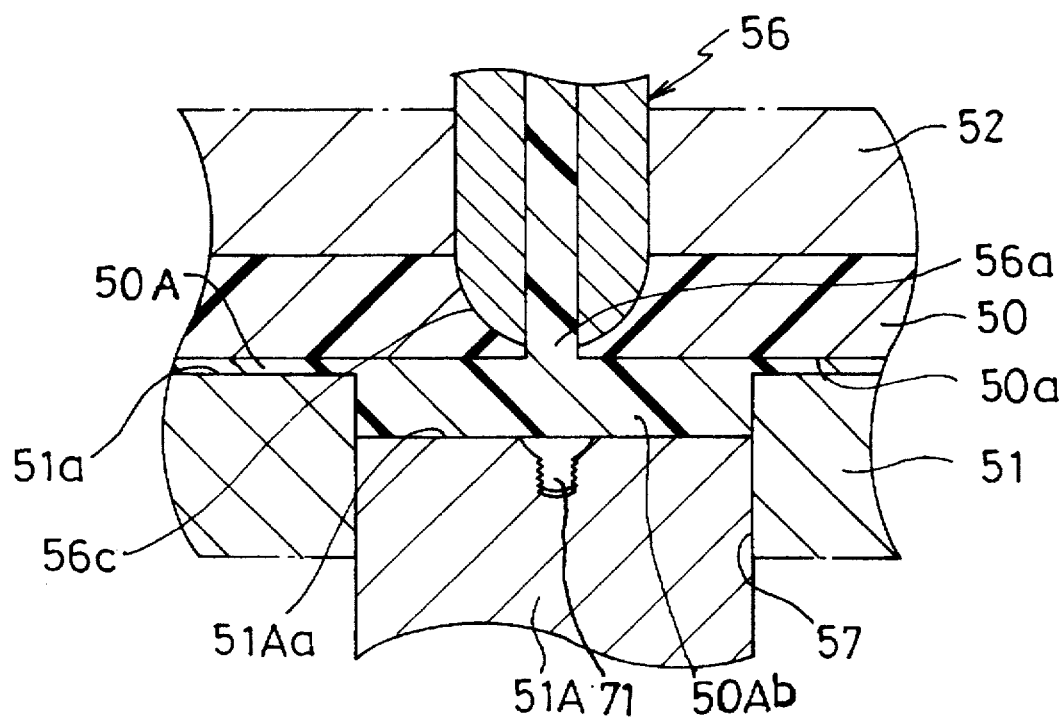
Figure 35:
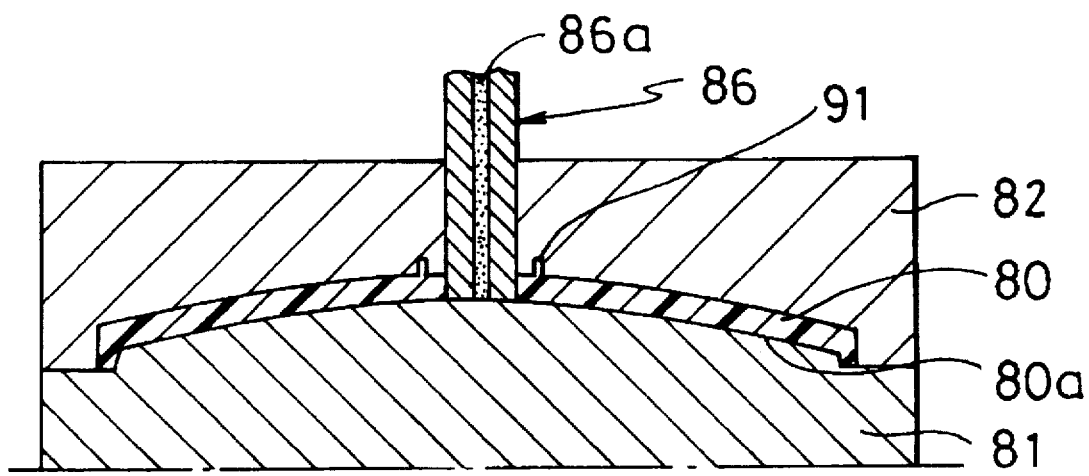
FIG. 35 is a fragmentary sectioned view of the resin-coating apparatus in another embodiment according to the present invention, at the time when the molds are clamped.
Figure 36:
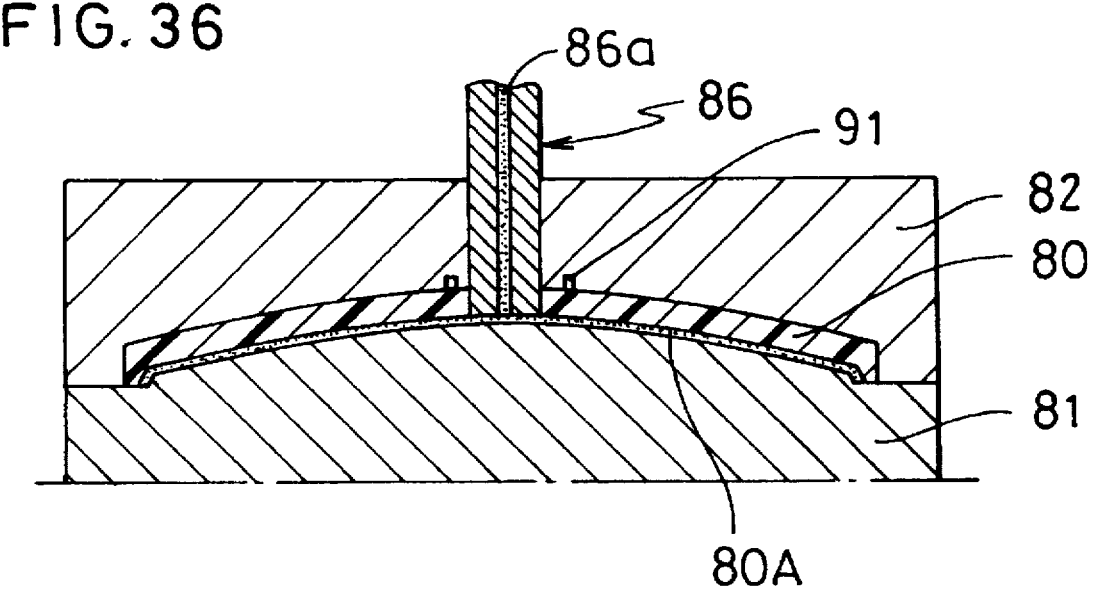
FIG. 36 is a fragmentary sectioned view showing a state in which the fluid resin molding is injected from a state of FIG. 35.
Figure 37:
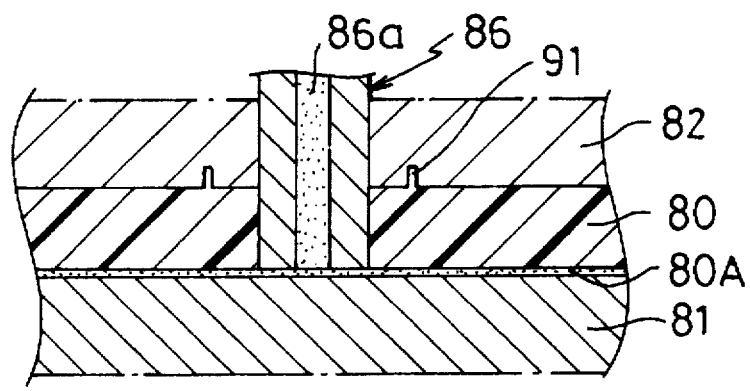
FIG. 37 is a sectioned view as magnified of a main part in another working aspect of the apparatus of FIG. 35.

Referring next to FIGS. 32 to 34, there is shown another working aspect of the resin-coating apparatus in the third feature of the present invention. In this third working aspect of the resin-coating apparatus, the tip end portion 56c of the coating material supply device 56 which engages the molding 50 is curved to be convex at a desired curvature and tapered. In this case, engaging part of the molding 50 which faces the tip end portion 56c of the coating material supply device 56 is caused to effectively joined with the tip end portion 56c, so that the coating material can be reliably prevented from leaking to any unnecessary portion, as will be appreciated.

Referring to FIGS. 35 to 42, there is shown a resin-coating apparatus realizing a fourth feature of the present invention. The resin-coating apparatus of this embodiment is so constituted that the upper mold 82 is provided with an injecting port 86a of the coating material supply device 86, the molding 80 is formed with a mold comprising this upper mold 82 and a lower mold 81, the fluid containing material injected from the injecting port 86a is made to be supplied, passing through the molding 80, to one side surface 80a (bottom side surface in the drawings) of the molding 80, and the resin coating layer 80A may be formed on this one side surface.

Figure 38:
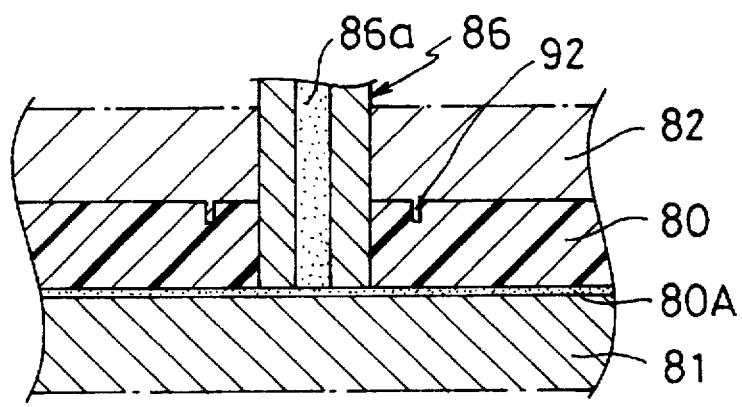
FIG. 38 is a sectioned view as magnified of the main part in another working aspect closely resembling the apparatus of FIG. 35.
Figure 39:
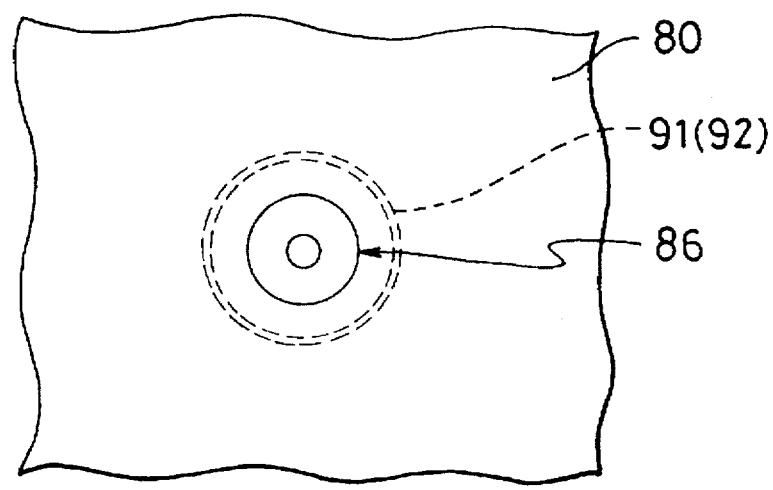
FIG. 39 is a schematic bottom view of FIGS. 37 and 38.

In the upper mold 82 provided with the above injecting port 86a, a groove 91 is formed adjacent to the position where the injecting port 86a is provided, so as to externally enclose the port. In this case, a projection 92 may be provided for the external enclosure, as shown in FIG. 38. It is also preferable to provide such groove 91 or projection 92 in annular shape as in FIG. 39.

The foregoing groove 91 or projection 92 should preferably be made to have a width of 0.5 to 10 mm and a depth or height of 0.5 to 10 mm.

In the resin-coating apparatus of this embodiment, first, such resin molding material as SMC or the like is disposed within the mold in the state where the upper and lower molds 82 and 81 are opened, and the molding 80 is formed with the upper and lower molds 82 and 81 clamped and through the hot compression. In this case, the molding is left in a state not reaching the complete curing. At this time, further, the injecting port 86a is kept in a state inserted in the molding 80.

Next, the fluid coating material is supplied from this injecting port 86a onto one side surface (lower side surface in FIGS. 35–38), and the resin coating layer 80A is formed. At this time, part of the fluid coating material tends to flow from peripheral part of the tip end of the injecting port 86a into between the upper mold 82 and the molding 80, but the coating material is prevented from intruding onto the other side surface where no resin coating layer 80A is required (upper side surface in the drawings) by the groove 91 or the projection 92 according to the present feature (with the effect of stagnant in the case of the groove 91 or a dam-up in the case of the projection 92).

Figure 40:
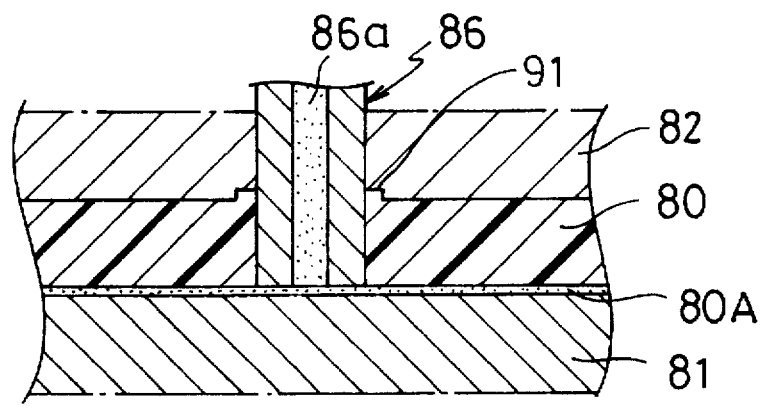
FIG. 40 is a sectioned view as magnified of the main part in another working aspect and corresponding to FIG. 37.
Figure 41:
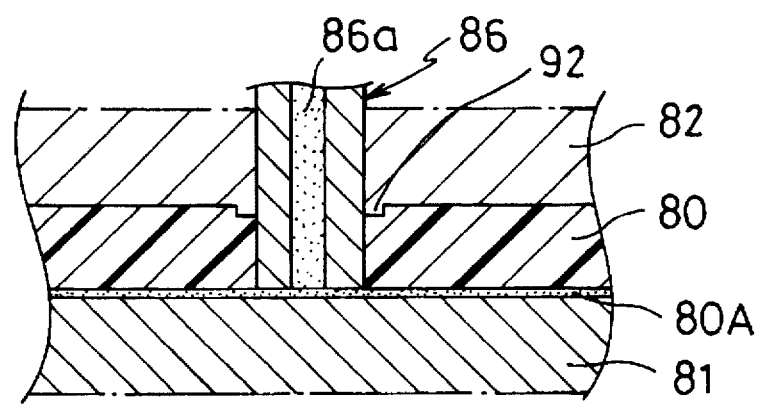
FIG. 41 is a sectioned view as magnified of the main part in still another working aspect and corresponding to FIG. 38.
Figure 42:
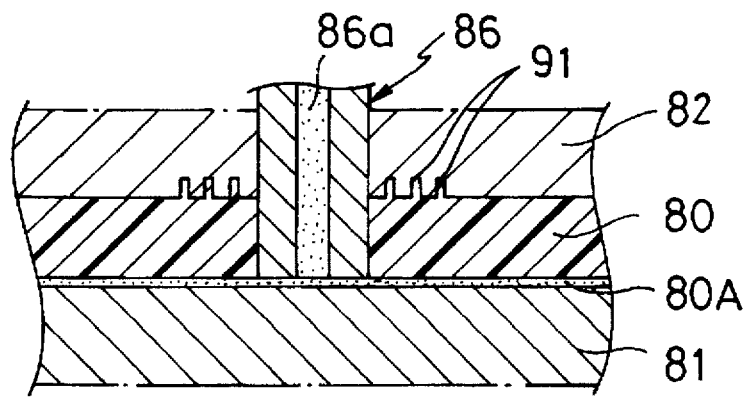
FIG. 42 is a sectioned view as magnified of the main part in yet another working aspect and corresponding to FIG. 36.

As shown in FIGS. 40 or 41, further, the groove 91 or projection 92 may be provided closely adjacent to the injecting port 86a or, as shown in FIG. 42, a plurality of the grooves 91 may be provided as mutually spaced. It is of course possible to provide a plurality of the projections as mutually spaced (not shown).

Figure 43:
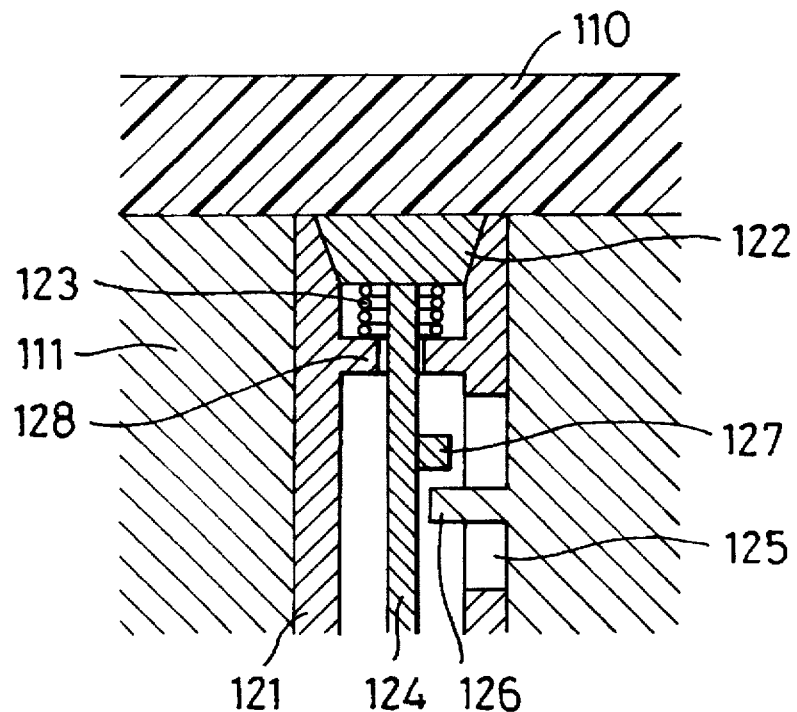
FIGS. 43 to 46 are explanatory views for the steps from a mold opening to the fluid coating material injection.
Figure 44:
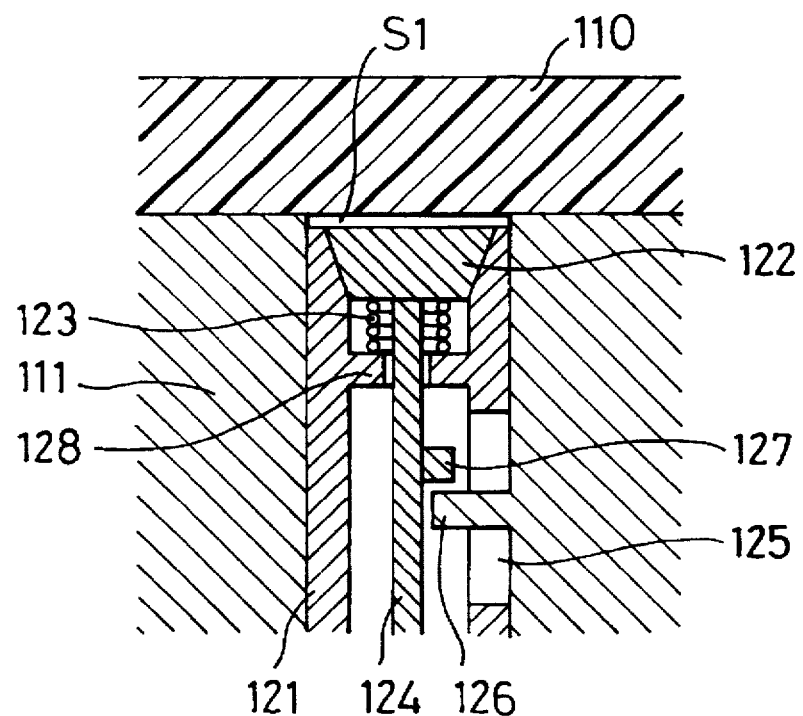

In FIG. 43, there is shown a resin-coating apparatus for realizing a fifth feature of the present invention. The resin-coating apparatus of this embodiment includes a lower mold 111 which cooperates with the substantially same upper mold (not shown) as that employed in the respective foregoing embodiments, while the lower mold 111 is provided therein with a cylinder 121 in which an air valve 122 is provided for opening and closing an air flow path within the cylinder 121. A resilient load of a spring 123 is is applied to the air valve 122, and a valve rod 124 of the air valve 122 and carrying thereabout the spring 123 is extended in the cylinder. A slit 125 is provided in part of peripheral wall of the cylinder 121 to extend in axial direction, and a stopper 126 projecting from the lower mold 111 is freely engaged in this slit 125. Further, the valve rod 124 is provided with a stopper 127 projecting therefrom for abutting the stopper 126 and with an inward flange 128 bulging inside the cylinder.

Referring in the followings to the operation of the present embodiment with reference to FIGS. 43 to 48, the molding 110 of the molding material hot-compressed is placed in FIG. 43. Next, the cylinder 121 and air valve 122 having the valve rod 124 are integrally slightly lowered from the state of FIG. 43 to that shown in FIG. 44, and a gap S1 is formed between the lower surface of the molding 110 and the upper surface of the air valve 122. In this state, the stopper 127 is not in engagement with the stopper 126.

Figure 45:
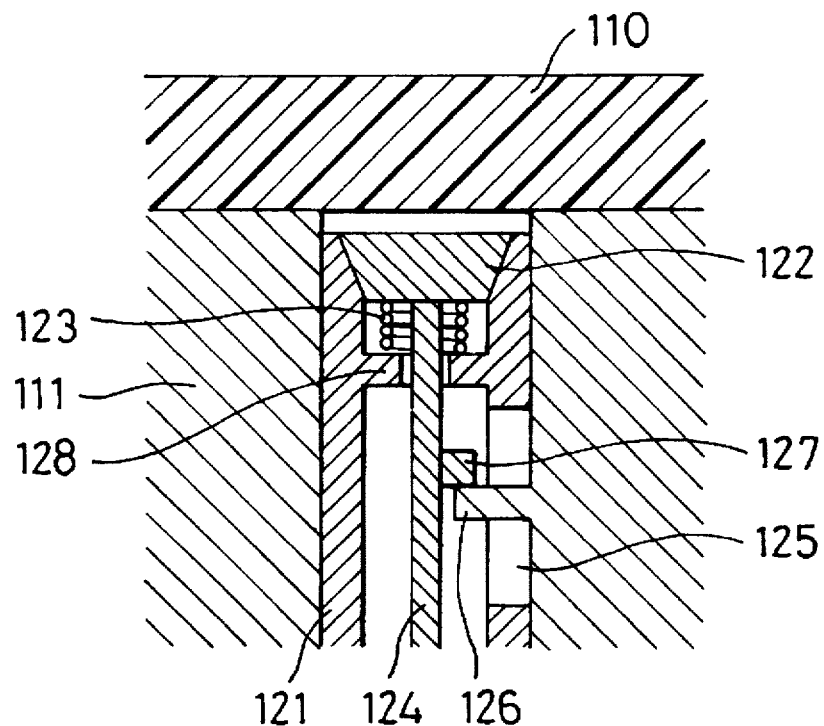
Figure 46:
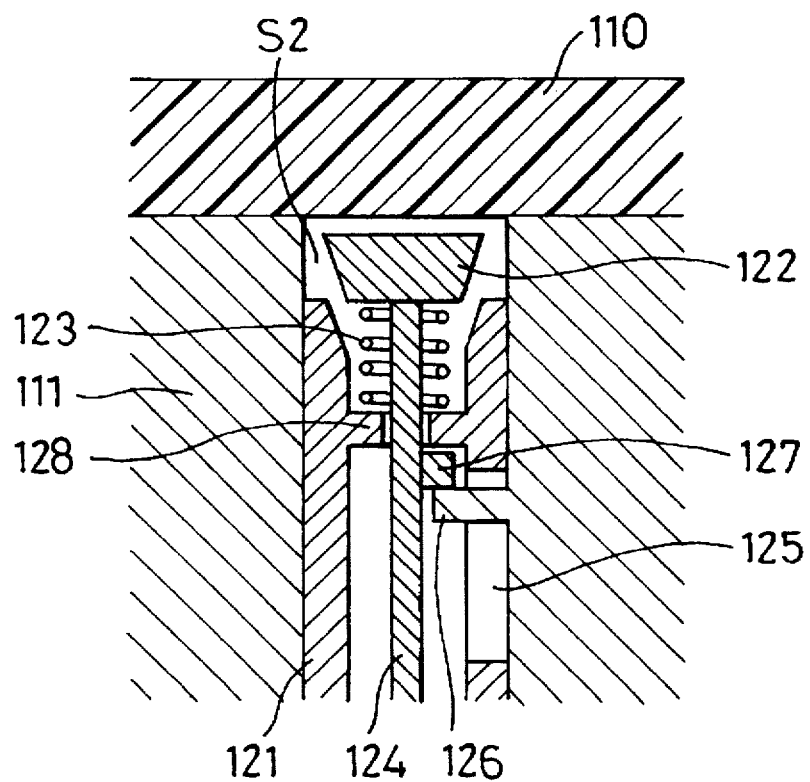

As the cylinder 121 and air valve 122 having the valve rod 124 are further slightly lowered integrally as in FIG. 45, the stopper 127 is locked by the stopper 126, and the air valve 122 having the valve rod 124 is prevented from being further lowered. Thereafter, the cylinder 121 independently descends by a distance allowed by axial length of the slit 125. Here, as the inward flange 128 which constituting a receiving seat for the spring 123 also descends, the stopper 127 is made to be in a state of being held between the stopper 126 and the inward flange 128, and the descend of the cylinder 121 stops. In this state, the air valve 122 is caused by the resiliency of the spring 123 to be separated from the inner periphery of the cylinder 121, and an air flow path S2 is formed.

Figure 47:
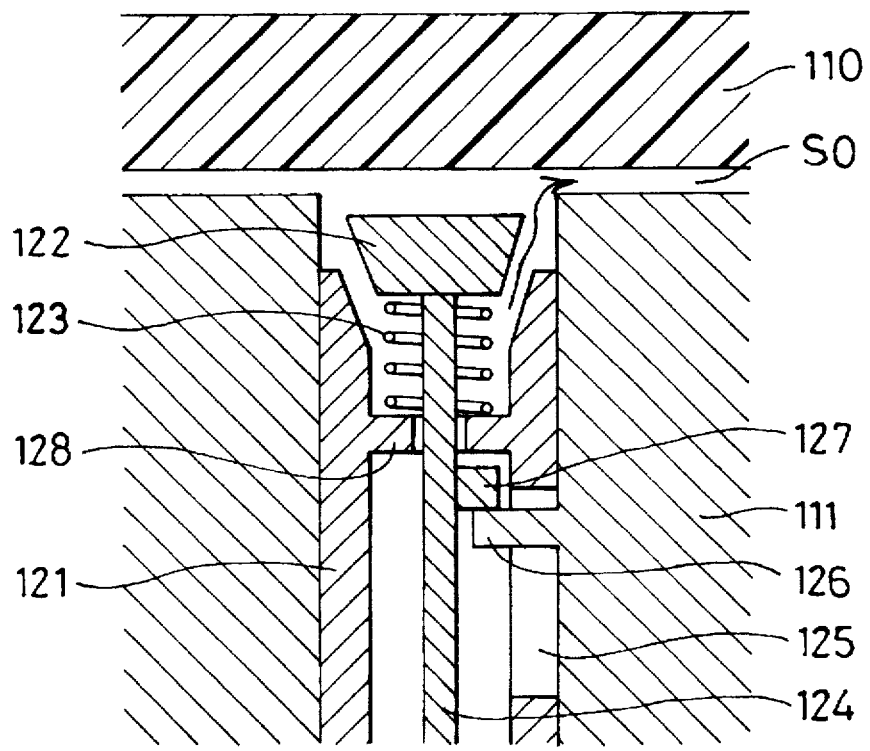
FIGS. 47 and 48 are explanatory views for operating sequence respectively of the apparatus in FIGS. 43 to 46.
Figure 48:
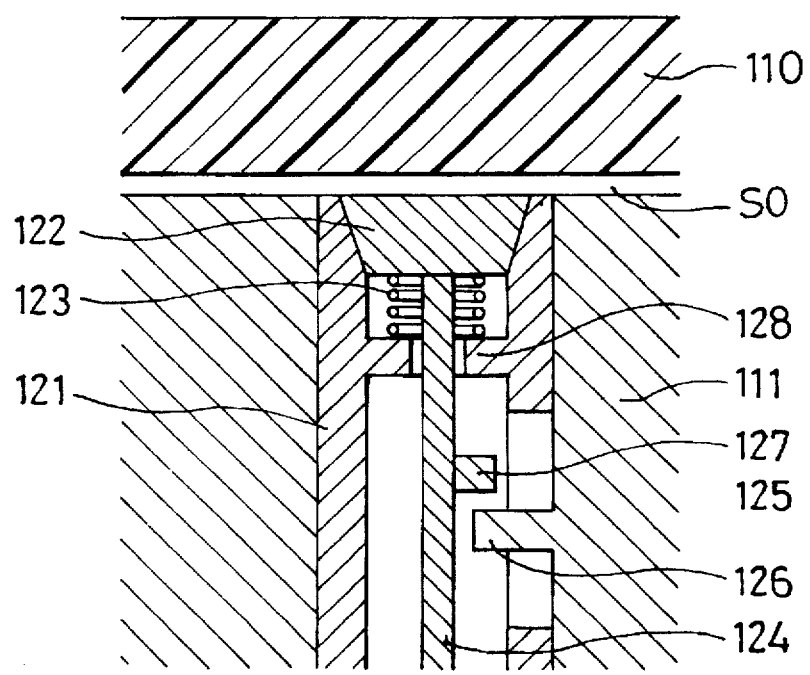

Consequently, a supply of air from lower side of the cylinder 121 causes air to flow as indicated by an arrow as shown in FIG. 47, the molding 110 is pushed upward by an air pressure at this time, and a space S0 is formed between the molding and the lower mold 111. As the molding 110 is pushed upward and the space S0 is formed as shown in FIG. 48, the valve rod 134 of the air valve 122 and the cylinder 121 operate in inverse sequence to the above, and they move upward until the upper surface of the air valve 122 comes flush with the upper surface of the lower mold 111. Here, the fluid coating material is injected from, for example, the same injecting nozzle as has been employed in the respective foregoing embodiments into the space S0, and then the resin coating layer can be formed in the space S0. At this time, the air valve 122 is seated on the inner periphery of the cylinder 121 closely tightly so that the operation of air-ejecting nozzle mechanism (not shown) should never be affected by anything which tends to enter into the cylinder 121 and eventually the nozzle mechanism.

Figure 49:
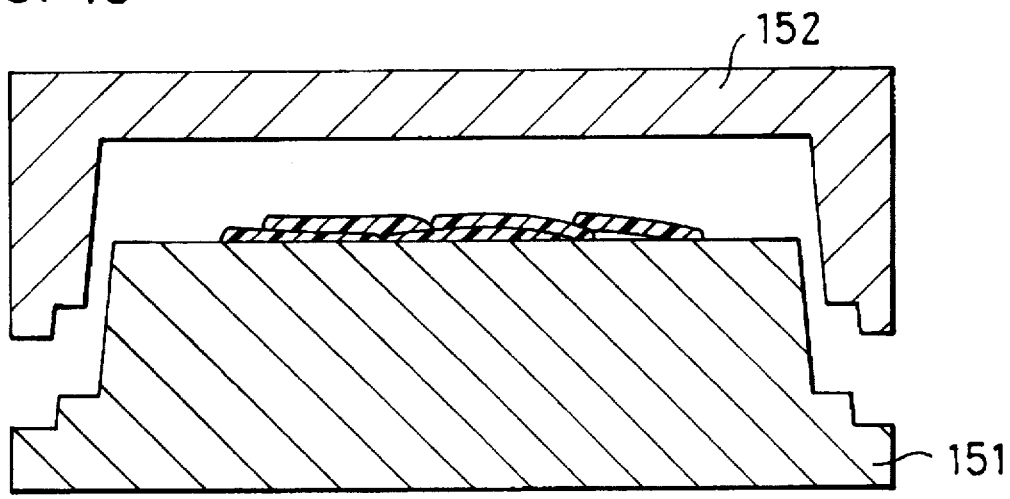
FIGS. 49 to 51 are sectioned views at different position from FIGS. 47 and 48 for explaining the operating sequence of the apparatus in FIGS. 43 to 46.
Figure 50:
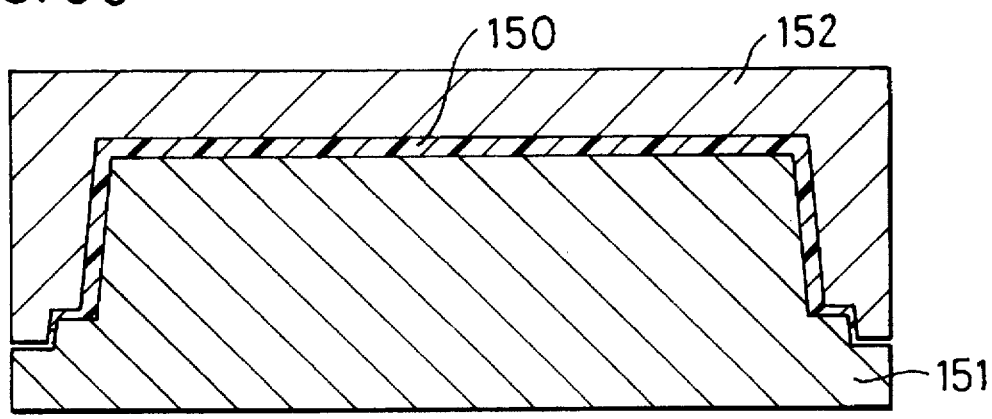
Figure 51:
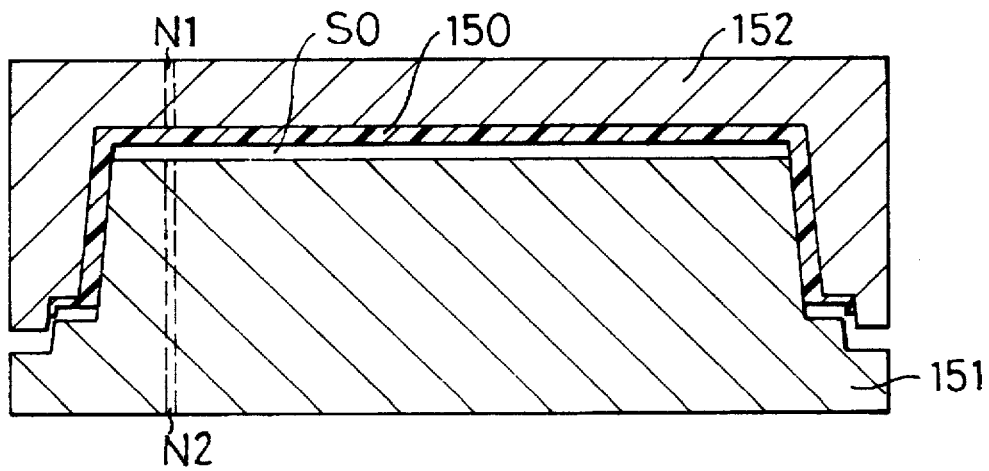

While in the above the disposition of the space S0 for forming the resin coating layer has been referred to with reference to FIGS. 43 to 48, the molding material is placed between the lower mold 151 and the upper mold 152 as in FIG. 49, the molding 150 is formed, the molds are clamped as in FIG. 50 to form the molding 150 through the hot-compression and, thereafter, the space S0 is formed between the molding 150 and the lower mold 151 as shown in FIG. 50 and in such aspect as shown in FIGS. 43 to 48. N1 or N2 is a nozzle path for injecting the coating material, and it is general that, when the injection is made through N1, the nozzle is provided to penetrate through the molding while, when the injection is made through N2, the nozzle is opened towards the space S0. Thus, the coating material is enabled to be supplied from N1 or N2 to the space S0.

Referring to FIGS. 52 to 55, there is shown a resin-coating apparatus for realizing a sixth feature of the present invention, in which apparatus, too, the arrangement is so made that the fluid coating material is injected through the injecting port 186a of the coating material supply device 186 to one side surface (lower side surface in the drawings) of the molding 180 molded with the split-type mold comprising the lower and upper molds 181 and 182 to form the resin coating layer 180A. The shear edge 191 at side end parts of the split lower and upper molds 181 and 182 is formed into two steps of inside and outside shear edges 191A and 191B, and a space 192 between the lower the upper molds 181 and 182 at the outside shear edge 191B is provided to be smaller than a space 193 at the inside shear edge 191A. Further, the outside shear edge 191B is provided to have a length larger than the length of the inside shear edge 191A.

Figure 52:
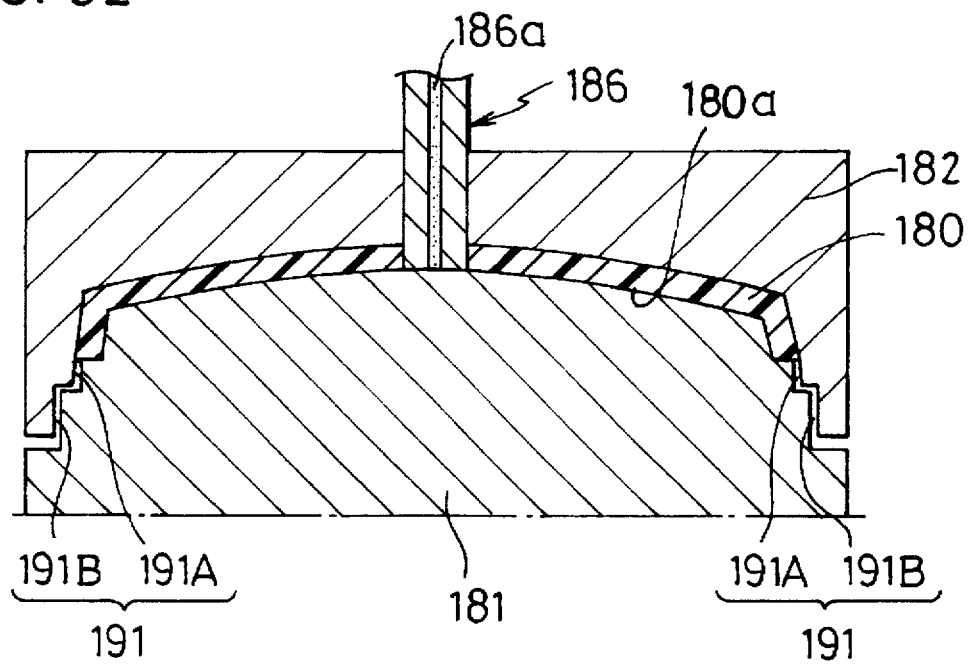
FIG. 52 is a fragmentary sectioned view of the resin-coating apparatus in another embodiment according to the present invention.
Figure 53:
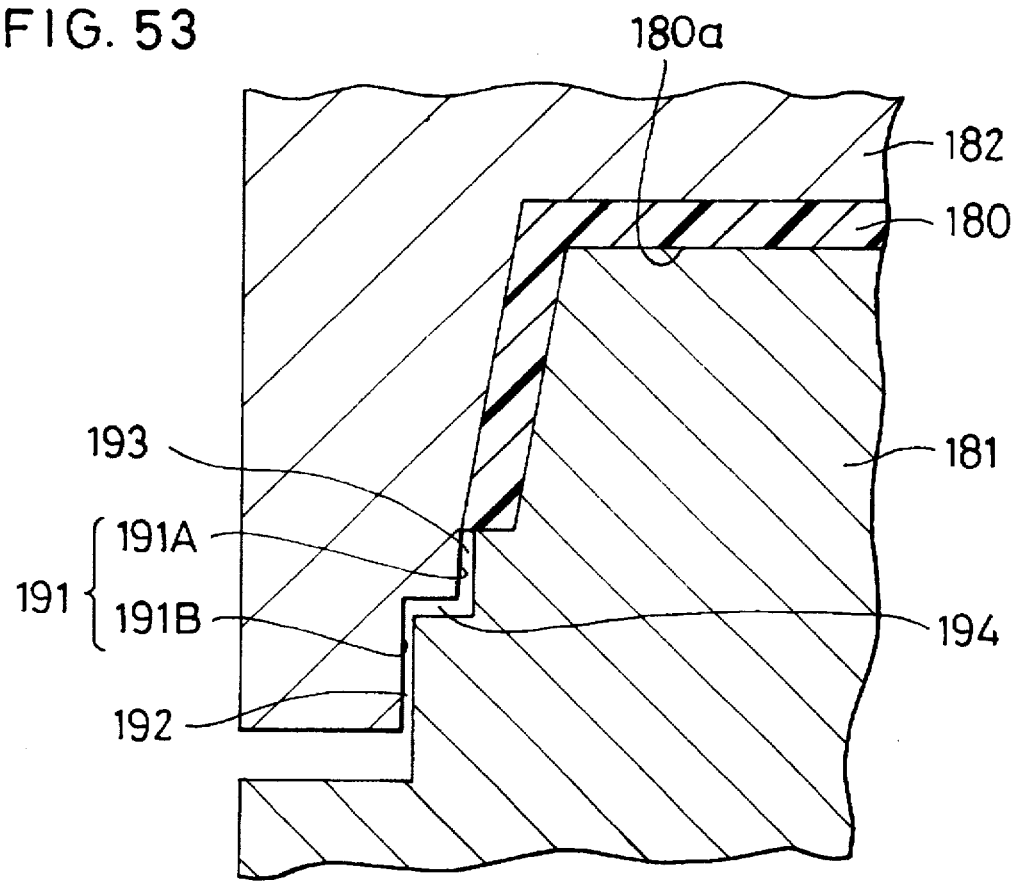
FIG. 53 is a sectioned view as magnified of a main part of FIG. 52.
Figure 54:
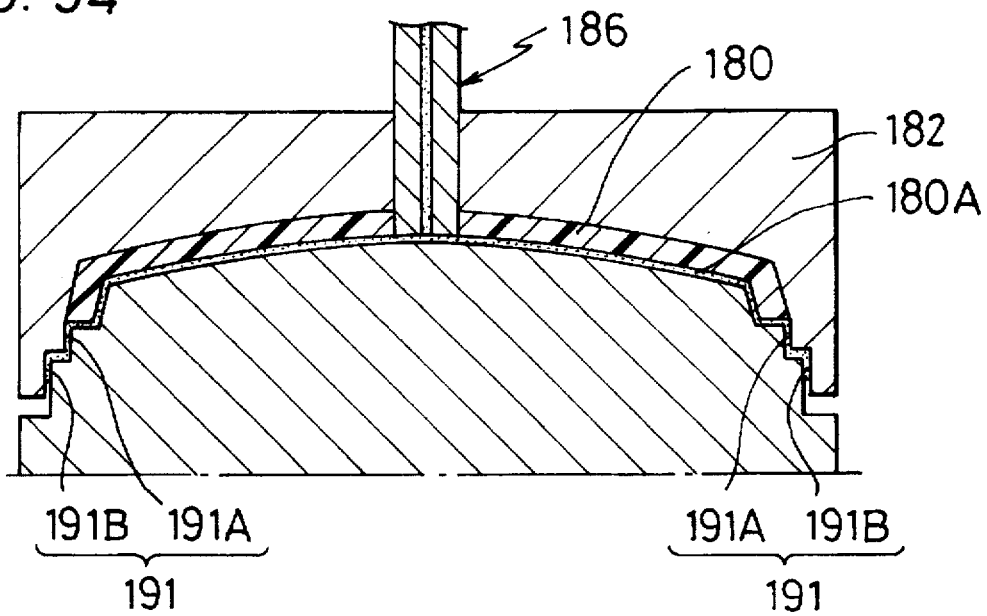
FIG. 54 is a fragmentary sectioned view showing a state in which the coating material is injected and re-pressurized from the state of FIG. 52.
Figure 55:
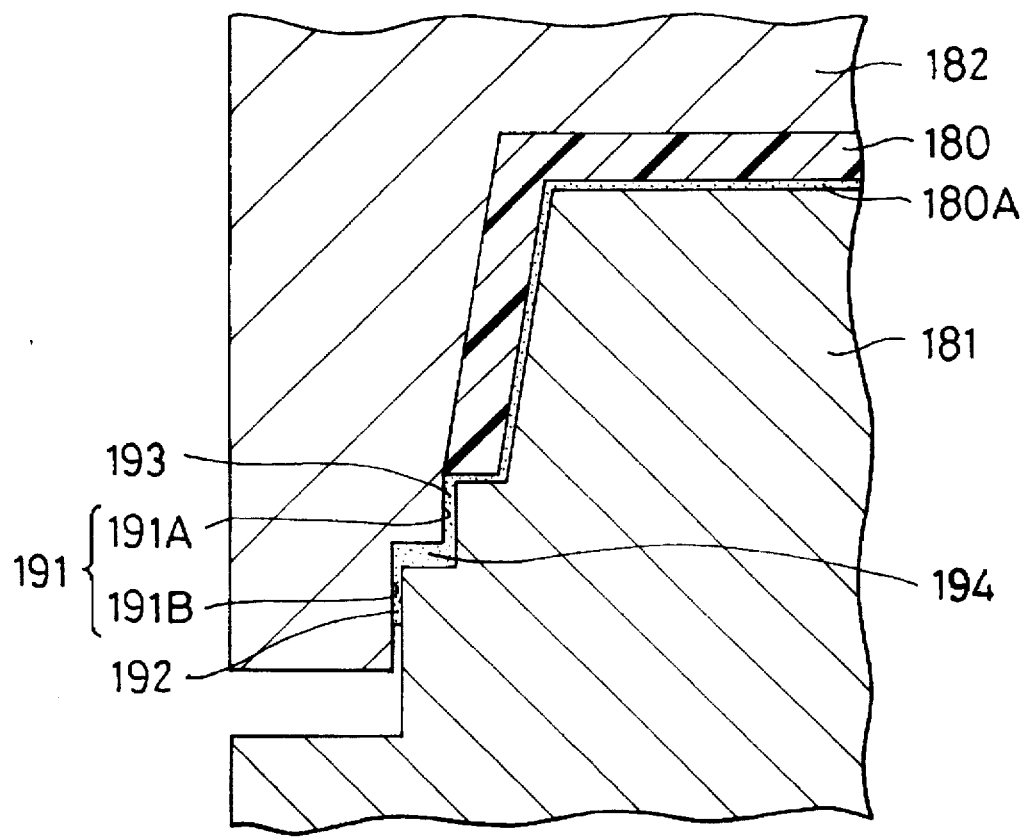
FIG. 55 is a sectioned view as magnified of the main part of FIG. 54.

In the resin-coating apparatus in the present embodiment, too, such resin molding as SMC or the like is first placed in the state where the lower and upper molds 81 and 182 are opened. Next, the lower and upper molds 181 and 182 are clamped as shown in FIGS. 52 and 53. Next, the coating material is injected onto one side surface 180a of the molding 180 to form the resin coating layer 180A as shown in FIGS. 54 and 55.

In this case of the resin-coating apparatus according to the present feature, it is made possible that, upon the re-compression with respect to the fluid coating material injected, any leaking of the coating material out of the inside shear edge 191A is prevented by means of the outside shear edge 191B made longer than the inside shear edge 191A.

It is made thereby possible to control in two stages the amount of the coating material leaking out of the shear edge 191 to be proper, so that the coating material can be prevented from leaking excessively to the exterior, and cleaning work of the lower and upper molds 181 and 182 after the molding can be completed in shorter time. Further, any bubble or dust within the fluid coating material is caused to stay in a space 194 at a step portion between the inside shear edge 191A and the outside shear edge 191B, and absorption of such bubble or dust can be effectively realized at this portion.

Figure 56:
FIG. 56 is a sectioned view as magnified of the main part of the resin-coating apparatus in another embodiment according to the present invention at the time when the coating material is injected and re-pressurized.

In a working aspect shown in FIG. 56, the inside shear edge 191A and outside shear edge 191B formed to be two steps are so provided that the section 192 of the leak-resisting between the lower and upper molds 181 and 182 at the outside shear edge 191A is narrower than the first section 193 of the leak-resisting at the inside shear edge 191A.

According to the resin-coating apparatus of this working aspect, therefore, it is made possible to control the fluid coating material leaking out of the inside shear edge 191A upon the re-compression of the coating material injected, at the outside shear edge 191B provided to have the smaller space 192 than the space 193 between the lower and upper molds 181 and 182 at the inside shear edge 191A.

It should be also appreciated that, with the foregoing arrangement of the present feature, the leaking amount of the coating material out of the shear edge 191 can be controlled in two stages to be proper as has been partly referred to in the above, and the coating material is made not to excessively leak to the exterior so as to render the cleaning of the lower and upper molds after the molding to be completed in a shorter time.

Figure 57:
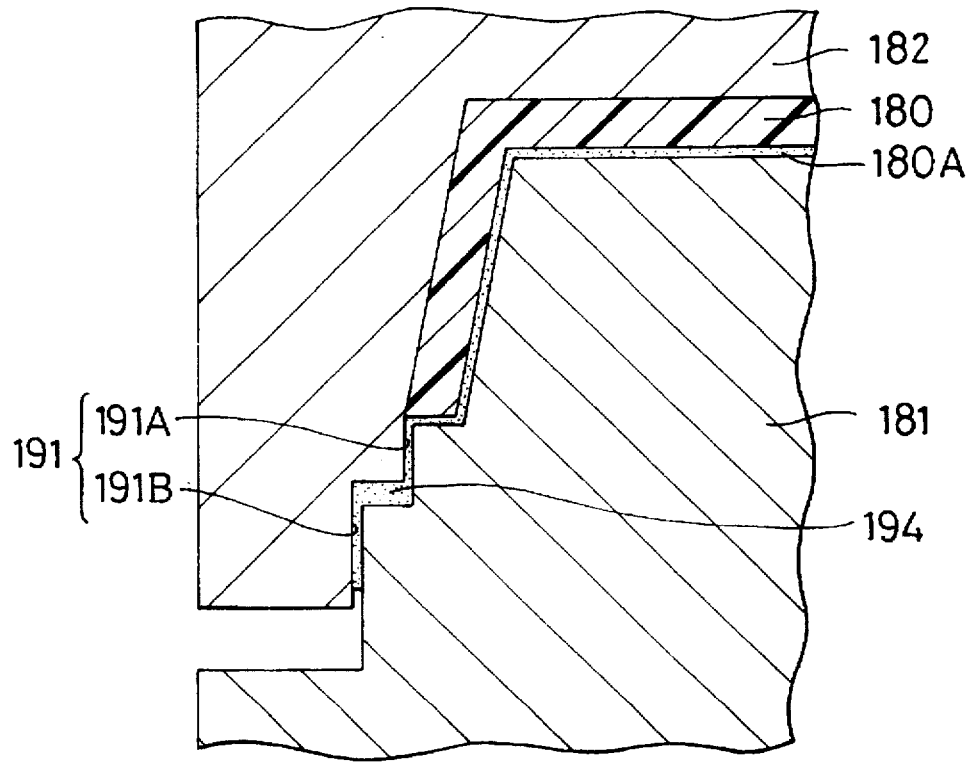
FIG. 57 is a sectioned view as magnified of the main part of the resin-coating apparatus in still another embodiment according to the present invention at the time when the coating material is injected and re-pressurized.

In a working aspect shown in FIG. 57, the inside and outside shear edges 191A and 191B are so formed that the outside shear edge 191B has a larger length than that of the inside shear edge 191A. With the arrangement of FIG. 57, it is made possible that an outflow of the fluid coating material leaking from the inside shear edge 191A upon the re-compression of the coating material injected can be controlled at the outside shear edge 191B made longer than the inside shear edge 191A, whereby the amount of the coating material leaking out of the shear edge 191 is made controllable in two states to be proper and, in addition, the coating material is made not to excessively leak to the exterior, so as to render the cleaning of the lower and upper molds after the molding to be completed in a shorter time.

As the optimum molding material for forming the molding according to the present invention, there is provided a thermosetting molding material constituting a seventh feature of the present invention in order to obtain an excellent resin molded product, that is, the in-mold coated, molded product. The thermosetting molding material emloyed in the present feature consists of such four components as a thermosetting resin, a radical polymerization initiator, a filler and a curing retarder.

For the thermosetting resin, first, it is possible to employ, irrespective of the type, any ones so long as they are used in general as molding resins of SMC and BMC. In practice, unsaturated polyester resin, (meta)acrylic modified unsaturated polyester resin, phenolic resin, epoxy resin, urethane resin, vinyl ester resin, diallyl phthalate resin or the like may be enumerated.

For the radical polymerization initiator, such known radical polymerization initiators as ketone peroxiders, dialperoxides, hydroperoxides, dialkylperoxides, alkylperesters, percarbonates, peroxy ketals or the like may be used, at an amount of use of 0.1 to 10 parts by weight, preferably 0.5 to 5 parts by weight with respect to 100 parts by weight of the thermosetting resin.

For the filler, any of ones ordinarily employed in SMC, BMC and the like may be employed, examples of which will be calcium carbonate, clay, talc, barium sulfate, aluminum hydroxide, hollow ceramics, hollow glass and the like. A suitable amount of use of them will be 30 to 600 parts by weight with respect to 100 parts by weight of the thermosetting resin. Further, such fibrous reinforcement as glass fibers, carbon fibers, organic fibers or the like may be added as occasion demands, and the reinforcement of 3 to 50 parts by weight with respect to 100 parts by weight of the thermosetting resin should preferably be employed.

For the curing retarder, on the other hand, it will be possible to use, for example, such SH group-containing moldings as mercaptans of the number of carbon 5 to 20, thyoglycols, SH group-containing silicates and the like; one or more of phenolic moldings selected from the group consisting of α-methylstyrene, stilbene, 4-phenoxystyrene, cumene, and 4-methyl-2,4-diphenyl-pentene -1; such monoterpene (terpene of carbon number 10) hydrocarbon as terpinolene, limonene, α-pinene, β-pinene, myrcene or the like; alone or in a mixture of two or more of them.

Curing phenomenon of the thermosetting molding material of the radical polymerization type is represented by a required time until the gelation (which shall be referred to hereinafter as a gelation time GT), time until completion of curing (which shall be referred to hereinafter as the minimum curing time MCT) and their interposition time, that is., a time from the gelation to the completion of the curing (which shall be referred to as the reactivity C-G). However, in order to obtain the resin molded product having an excellent adhesion as has been referred to, it is desirable that a state in which the curing of the molding material has advanced to some extent can be maintained for long, that is, it is desired to prolong the C-G, and it is made possible to have the C-G maintained for more than twice as long as that in ordinary case. This appears to be because the curing retarder catches the radical polymerization initiator to render it to become a relatively stable radical so that the ability of initiating the polymerization becomes weak to advance the polymerization moderately. A suitable amount of use of such curing retarder is 0.1 to 10 parts by weight, preferably 0.2 to 5 parts by weight, with respect to 100 parts by weight of the thermosetting resin. When the curing retarder is less than 0.1 parts by weight, the retarding effect cannot be sufficiently shown and, when the amount of addition exceeds 10 parts by weight, the curing becomes insufficient so as to render it difficult to obtain a high-performance resin molded product.

EXAMPLE 1

100 parts of bisphenolic unsaturated polyester resin (commercial name EPOLAC RF-1, manufactured by a Japanese firm K. K. NIPPON SHOKUBAI), 300 parts of aluminum hydroxide, 4 parts of zinc stearate, 1 part of mercaptopropyltrimethoxysilane (curing retarder), 1 part of tert-butyl perbenzoate, 1 part of magnesium oxide and 45 parts of chopped glass were kneaded by a kneader and aged at 40° C. for 48 hours, and a thermosetting molding material (BMC-1) was obtained.

EXAMPLE 2

Except for a use of 1 part of 4-methyl-2,4-diphenyl-pentene-1 in place of mercaptopropyltrimethoxysilane in Example 1, the thermosetting molding material (BMC-2) was obtained in the same manner as in Example 1.

EXAMPLE 3

Except for a use of 1 part of limonene in place of mercaptopropyltrimethoxysilane in Example 1, the thermosetting molding material (BMC-3) was obtained in the same manner as in Example 1.

Comparative Example

Except for non-use of the curing retarder, the molding material BMC was obtained in the same manner as in the Examples.

In order to measure the curing characteristics of these thermosetting molding materials, flat plates 10 mm thick and 300×300 mm were molded with molding temperature of 130° C. for the upper mold and of 120° C. for the lower mold. Result of the measurement at this time is shown in a following Table 1.

TABLE 1

|  | Molding Material | Gel Time (GT sec.) | Minimum Cure Time (MCT sec.) | Reactivity (C-G sec.) |
|---|---|---|---|---|
| Example 1 | BMC-1 | 80 | 190 | 110 |
| Example 2 | BMC-2 | 82 | 200 | 118 |
| Example 3 | BMC-3 | 81 | 220 | 139 |
| Comp. Ex. | BMC | 80 | 130 | 50 |

Next, using a coating material obtained by mixing through a high speed stirring 100 parts of vinyl ester resin (commercial name EPOLAC RF-1051; by Japanese firm K. K. NIPPON SHOKUBAI), 1 part of zinc stearate, 1 part of tert-butyl perbenzoate and 2 parts of fine powder silica, the resin coating was performed through next manufacturing. Injection:

The molding were opened after the primary curing, and the re-compression was made after the injection of the coating material for the curing.

Mold: Flat plates of 1000×650 mm

Mold Temperature: Upper mold 130° C., lower mold 120° C.

Molding Pressure: 80 kg/cm$^2$ commonly for prim. & sec. works

Molding Thickness: 10 mm

Coating Thick.: 100 μm

Primary Curing: 200 sec., 250 sec., 300 sec., 350 sec.

Secondary Curing: 200 sec.

The thus obtained resin molded products were subjected to an evaluation of the adhesion at central area CA and corner area SA of the flat-plate molded products by means of a lattice pattern test based on JIS K-5400. Further, their appearance was subjected to visual evaluation, and respective results were as shown in a following Table II. In the case where the primary curing time is less than 200 seconds, the curing of the molding material becomes insufficient, the coating material injected intrudes into the interior of the molding material, and eventually the resin molded product is deteriorated in the appearance. For this reason, the solid state properties were investigated with the primary curing time made more than 200 seconds.

TABLE II

|  | Molding Material | Prim. Curing Time (sec.) | Adhesion CA | Adhesion SA | Appearance |
|---|---|---|---|---|---|
| Example 1 | BMC-1 |  |  |  |  |
| 1-1 |  | 200 | 100 | 100 | Good |
| 1-2 |  | 250 | 100 | 100 | Good |
| 1-3 |  | 300 | 100 | 100 | Good |
| 1-4 |  | 350 | 100 | 90 | Good |
| Example 2 | BMC-2 |  |  |  |  |
| 2-1 |  | 200 | 100 | 100 | Good |
| 2-2 |  | 250 | 100 | 100 | Good |
| 2-3 |  | 300 | 100 | 100 | Good |
| 2-4 |  | 350 | 100 | 95 | Good |
| Example 3 | BMC-3 |  |  |  |  |
| 3-1 |  | 200 | 100 | 100 | Bad |
| 3-2 |  | 250 | 100 | 100 | Good |

TABLE II-continued

| Molding Material | Prim. Curing Time (sec.) | Adhesion CA | SA | Appearance |
|---|---|---|---|---|
| 3-3 | 300 | 100 | 100 | Good |
| 3-4 | 350 | 100 | 100 | Good |
| Comp. Ex. 1  Comp. BMC | | | | |
| 1-1 | 200 | 100 | 90 | Good |
| 1-2 | 250 | 90 | 80 | Good |
| 1-3 | 300 | 50 | 30 | Good |
| 1-4 | 350 | 0 | 0 | Good |

As will be clear from the above Table II, it has been found that, in the Example in which the curing retarder is employed according to the present invention, the working time band in which a sufficient adhesion can be obtained reaches 150 seconds (between 200 seconds and 350 seconds) whereas, in the Comparative Example, the adhesion is deteriorated in the case where the coating material is injected after when the primary curing has exceeded 250 seconds. Further, the resin molded products of the foregoing Examples show less fluctuation in the adhesion, and this should be extremely useful also in manufacturing large size resin molded products.

EXAMPLES 4-7

BMC-4 was prepared with e-methylstyrene in place of mercaptopropyltrimethoxysilane in Example 1 (Example 4). Further, ones similarly employing stilbene, 4-phenoxystyrene and cumene as the curing retarder were made respectively BMC-5, BMC-6 and BMC-7 (Examples 5, 6 and 7).

With these molding materials and the foregoing coating material empoyed, the resin molded products were obtained under the same molding conditions as in the above. The adhesion and appearance were evaluated in the same manner as in the above, and their results were shown in a following Table III.

TABLE III

| Molding Material | Prim. Curing Time (sec.) | Adhesion CA | SA | Appearance |
|---|---|---|---|---|
| Example 4  BMC-4 | | | | |
| 4-1 | 200 | 100 | 100 | Good |
| 4-2 | 250 | 100 | 100 | Good |
| 4-3 | 300 | 100 | 90 | Good |
| 4-4 | 350 | 100 | 80 | Good |
| Example 5  BMC-5 | | | | |
| 5-1 | 200 | 100 | 100 | Good |
| 5-2 | 250 | 100 | 95 | Good |
| 5-3 | 300 | 100 | 80 | Good |
| 5-4 | 350 | 90 | 65 | Good |
| Example 6  BMC-6 | | | | |
| 6-1 | 200 | 100 | 100 | Good |
| 6-2 | 250 | 100 | 100 | Good |
| 6-3 | 300 | 100 | 100 | Good |
| 6-4 | 350 | 100 | 90 | Good |
| Example 7  BMC-7 | | | | |
| 7-1 | 200 | 100 | 100 | Good |
| 7-2 | 250 | 90 | 80 | Good |
| 7-3 | 300 | 70 | 50 | Good |
| 7-4 | 350 | 50 | 20 | Good |

EXAMPLE 8

Except for a change of 100 parts of bisphenolic unsaturated polyester resin in Example 2 to 70 parts of bisphenolic unsaturated polyester resin and 30 parts of vinyl ester resin (EPOLAC RF-1002G; by Japanese firm K. K. NIPPON SHOKUBAI), BMC-8 was obtained in the same composition as in Example 2 and through the kneading and aging under the conditions referred to in Example 1.

EXAMPLE 9

Except for a use of 30 parts of urethane modified vinyl ester resin induced from hydroxyethyl methacrylate and 2,4-tolylene diisocyanate, in place of vinyl ester resin in Example 8, BMC-9 was obtained substantially in the same manner as in Example 8.

EXAMPLE 10

Except for a use of 30 parts of epoxy modified unsaturated polyester resin induced from iso-series unsaturated polyester resin (acid value 20, viscosity 9 poises) and glycidyl methacrylate, in place of vinyl ester resin in Example 8, BMC-10 was obtained substantially in the same manner as in Example 8.

The resin molded products were obtained with these molding materials and coating material employed under the samd molding conditions as in the foregoing. The adhesion and appearance were evaluated in the same manner as in the above, the their results were as shown in a following Table IV.

TABLE IV

| Molding Material | Prim. Curing Time (sec.) | Adhesion CA | SA | Appearance |
|---|---|---|---|---|
| Example 8  BMC-8 | | | | |
| 8-1 | 200 | 100 | 100 | Good |
| 8-2 | 250 | 100 | 100 | Good |
| 8-3 | 300 | 100 | 100 | Good |
| 8-4 | 350 | 100 | 100 | Good |
| Example 9  BMC-9 | | | | |
| 9-1 | 200 | 100 | 100 | Good |
| 9-2 | 250 | 100 | 100 | Good |
| 9-3 | 300 | 100 | 100 | Good |
| 9-4 | 350 | 100 | 95 | Good |
| Example 10  BMC-10 | | | | |
| 10-1 | 200 | 100 | 100 | Good |
| 10-2 | 250 | 100 | 100 | Good |
| 10-3 | 300 | 100 | 100 | Good |
| 10-4 | 350 | 100 | 90 | Good |

As will be clear from the above Tables III and IV, the time band in which a sufficient adhesion can be obtained reaches 100 to 150 seconds in Examples 4 to 10 employing the curing retarder according to the present invention, less fluctuation in the adhesion is seen, and this should be extremely useful in manufacturing, in particular, larger size resin molded products.

EXAMPLES 11-12

Except for an addition of 2 parts of 4-methyl-2,4-diphenyl-pentene-1 employed in Example 2, BMC-11 was obtained in the same manner as in Example 2. Further, with 4-methyl-2,4-diphenyl-pentene-1 added by 5 parts, BMC-12 was obtained.

The resin molded products were obtained with these mold comounds and the foregoing coating material employed under the same conditions as in the foregoing, and the adhesion and appearance were evaluated in the same manner as in the above, results of which were as shown in a following Table V.

TABLE V

|  | Molding Material | Prim. Curing Time (sec.) | Adhesion CA | SA | Appearance |
|---|---|---|---|---|---|
| Example 11 | BMC-11 | | | | |
| 11-1 | | 200 | 100 | 100 | Bad |
| 11-2 | | 250 | 100 | 100 | Good |
| 11-3 | | 300 | 100 | 100 | Good |
| 11-4 | | 350 | 100 | 100 | Good |
| Example 12 | BMC-12 | | | | |
| 12-1 | | 200 | 100 | 100 | Bad |
| 12-2 | | 250 | 100 | 100 | Bad |
| 12-3 | | 300 | 100 | 100 | Good |
| 12-4 | | 350 | 100 | 100 | Good |

Also in Examples 11 and 12, the time band in which a sufficient adhesion can be obtained has reached above 150 seconds as a result of the use of the curing retarder of the present invention. While some have presented bad appearance, there was seen no fluctuation in the adhesion at all.

Figure 58:
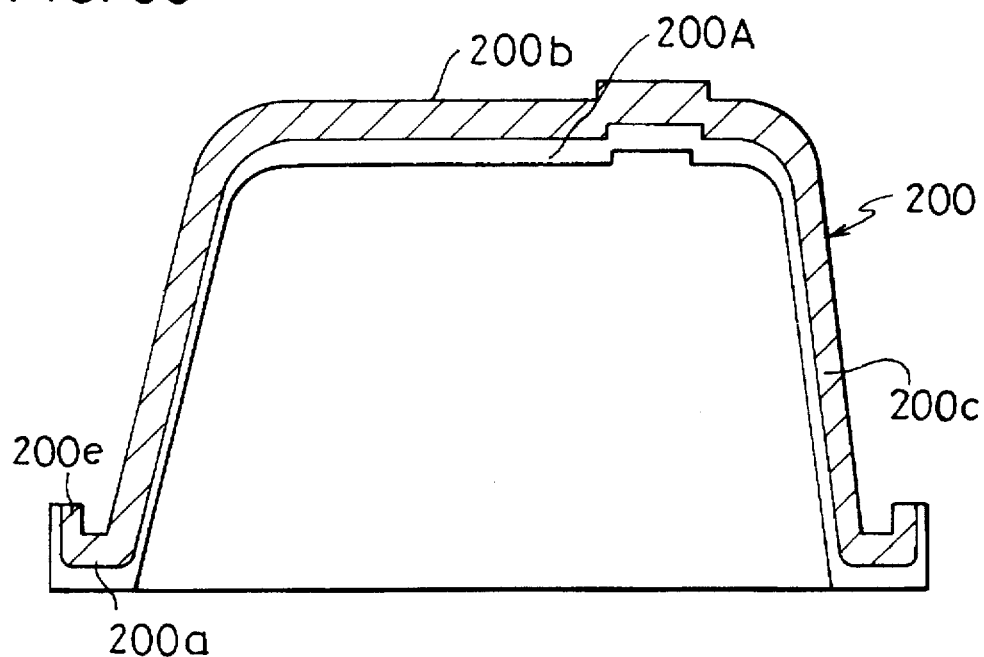
FIG. 58 is a sectioned view of a bathtub as the molded product according to the present invention.
Figure 59:
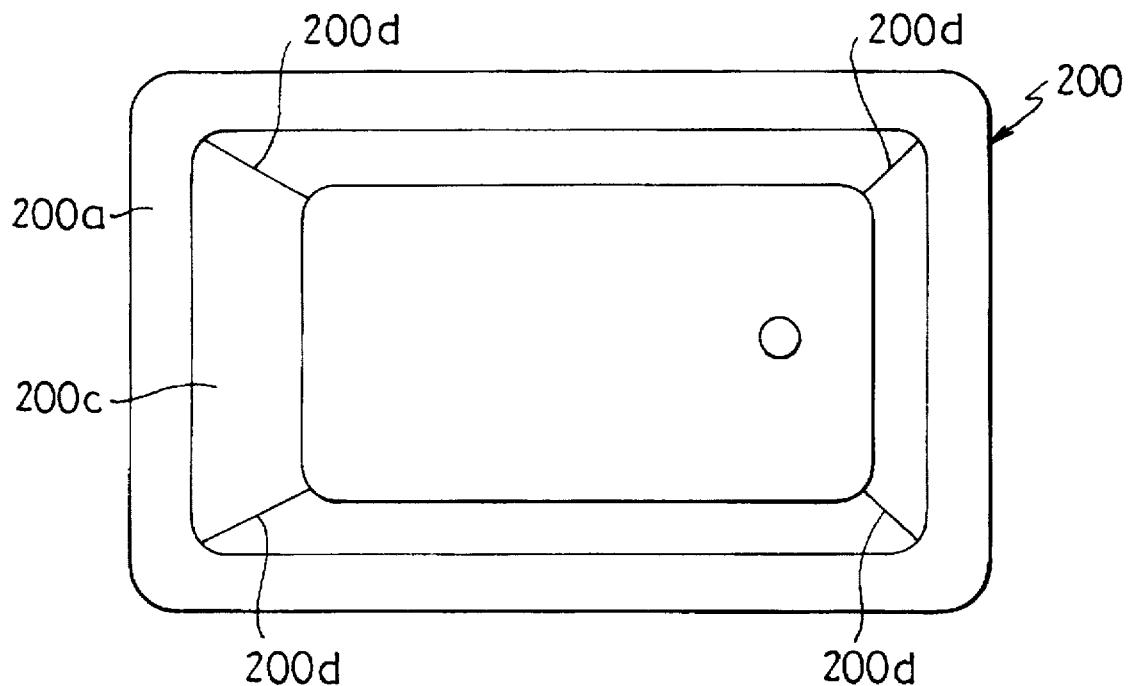
FIG. 59 is a plan view of FIG. 58.

According to an eighth feature of the present invention, the same can be applied to a resin molded product of a deep container shape. As an example of the application, FIGS. 58 and 59 show a bathtub, in which at least a flange part 200a, a bottom surface part 200b of a main body, an extended flange part 200e extending substantially vertically from the flange part 200a, elected surfaces 200c between the bottom part 200b and the flange part 200a, and corner parts 200d formed in the elected surfaces are provided. Further, in this bathtub, a molding of a shape having the elected surfaces 200c large in the length, that is of the deep container shape is formed a thermosetting resin reinforced by glass fibers, and a resin coating layer 200A is provided to cover a front surface of this molding 200.

Figure 60:
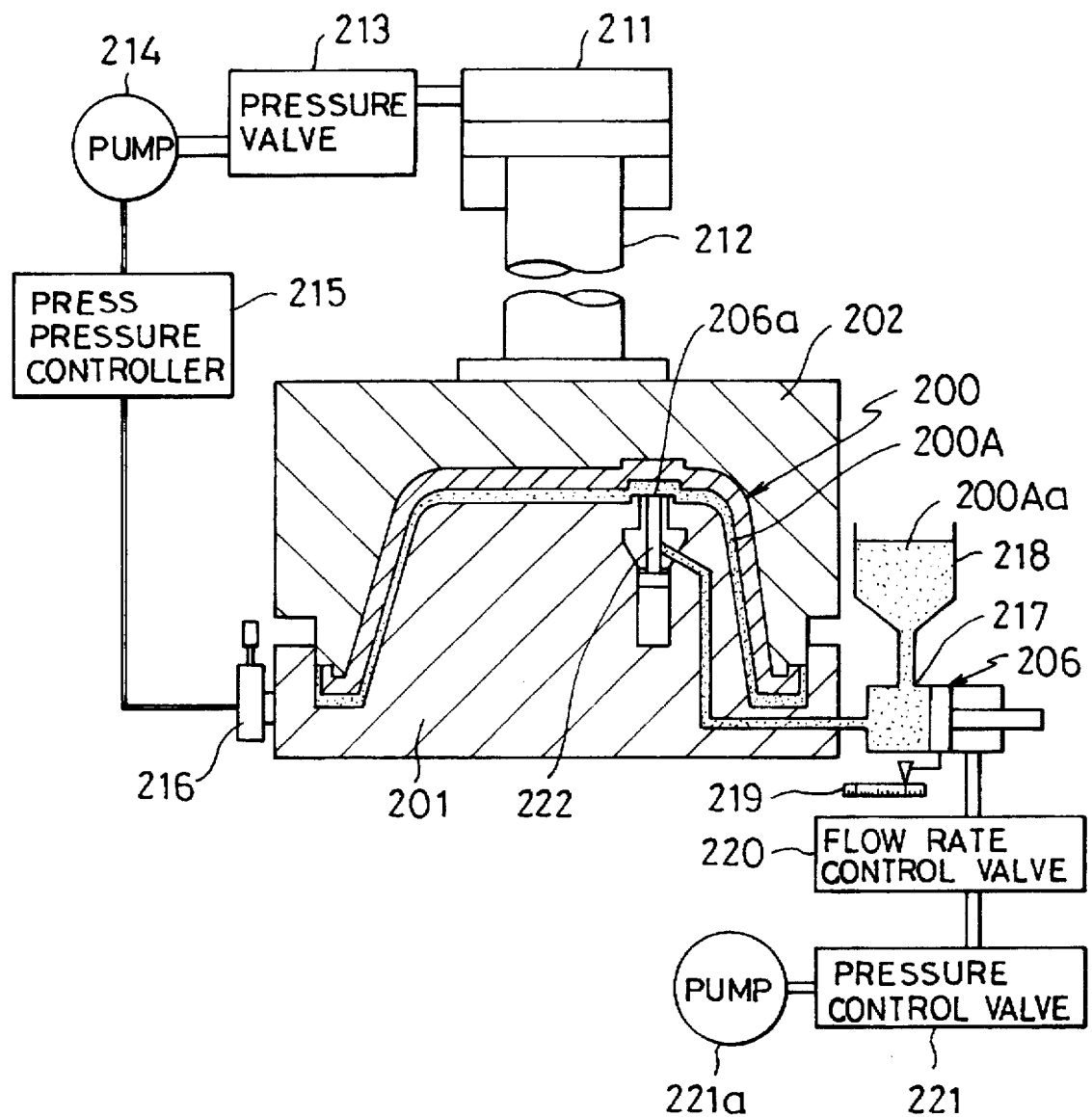
FIG. 60 is an explanatory view for the mold including upper and lower molds for manufacturing the bathtub of FIG. 58.

Referring further to FIG. 60, there is shown a molding apparatus for the bathtub A according to the present invention, which apparatus employs a mold comprising the stationary type lower mold 201 and the movable type upper mold 202, and to this upper mold 202 there are linked such cylinder device 211 as an oil-pressure cylinder, press ram 212, pressure control valve 213, pump 214, press pressure controller 215 and mold displacement meter 216. The lower mold 201 is provided with an injecting port 206a for the coating material, while a coating material supply device 206 including an injecting cylinder 217 of the coating material 200Aa comprises a tank 218, stroke detecting means 219 for the injecting cylinder 217, flow rate control valve 220, pressure control valve 221 and pump 221a, and an opening and closing valve 222 is provided in the injecting port 206a for the coating material.

Figure 61:
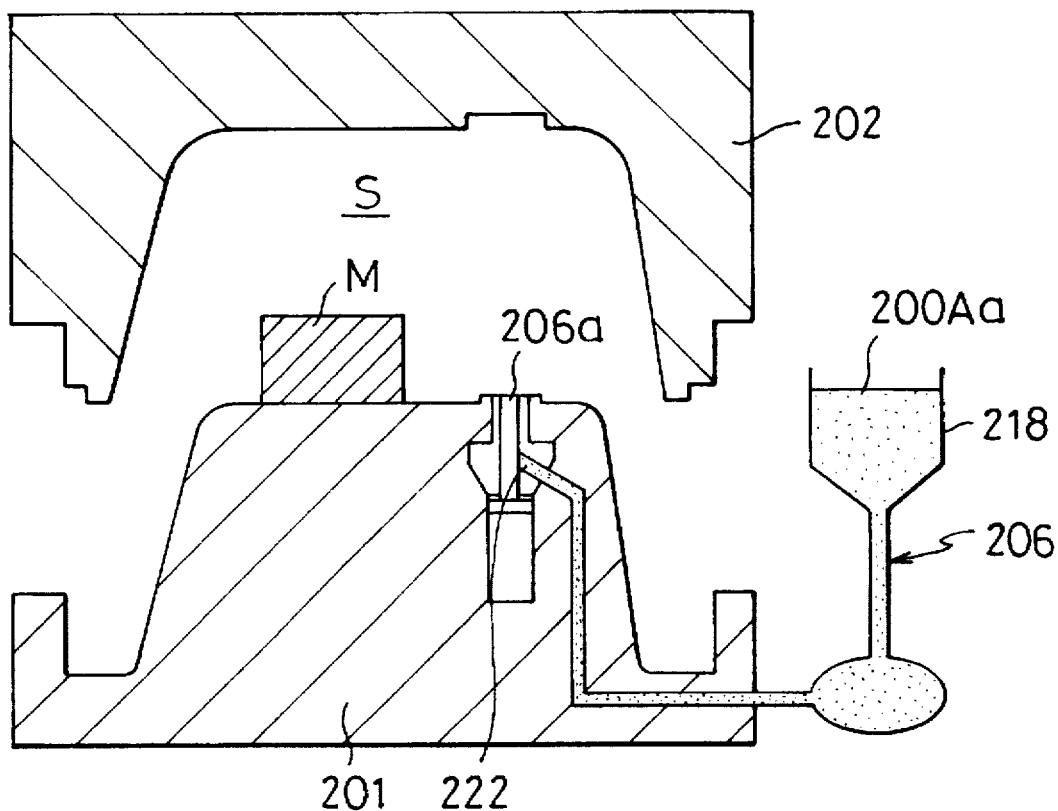
FIGS. 61 to 66 are explanatory views for manufacturing steps of the bathtub of FIG. 58.
Figure 62:
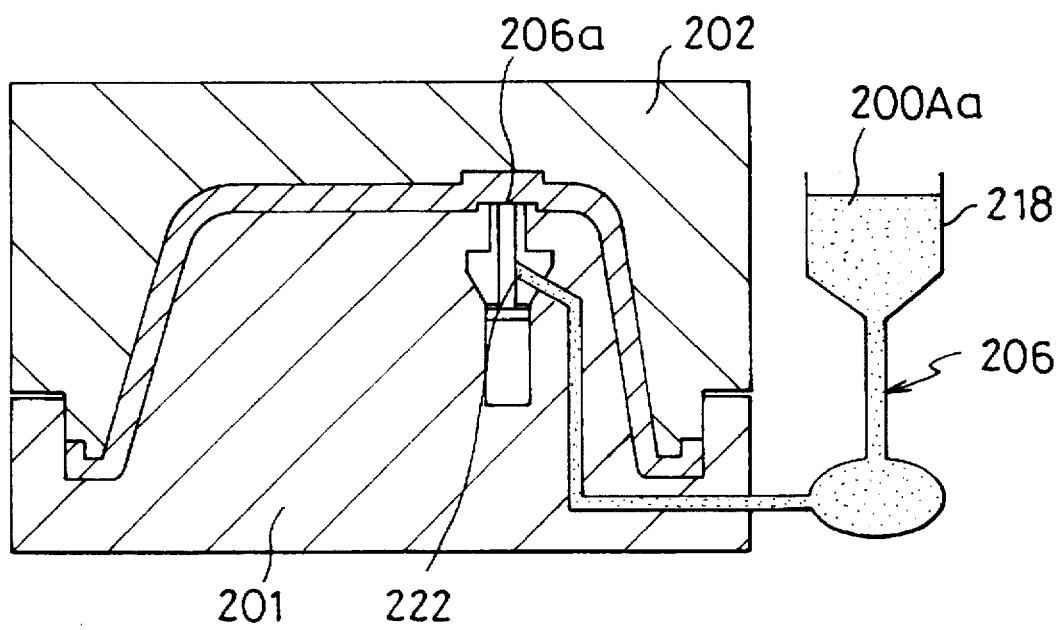
Figure 63:
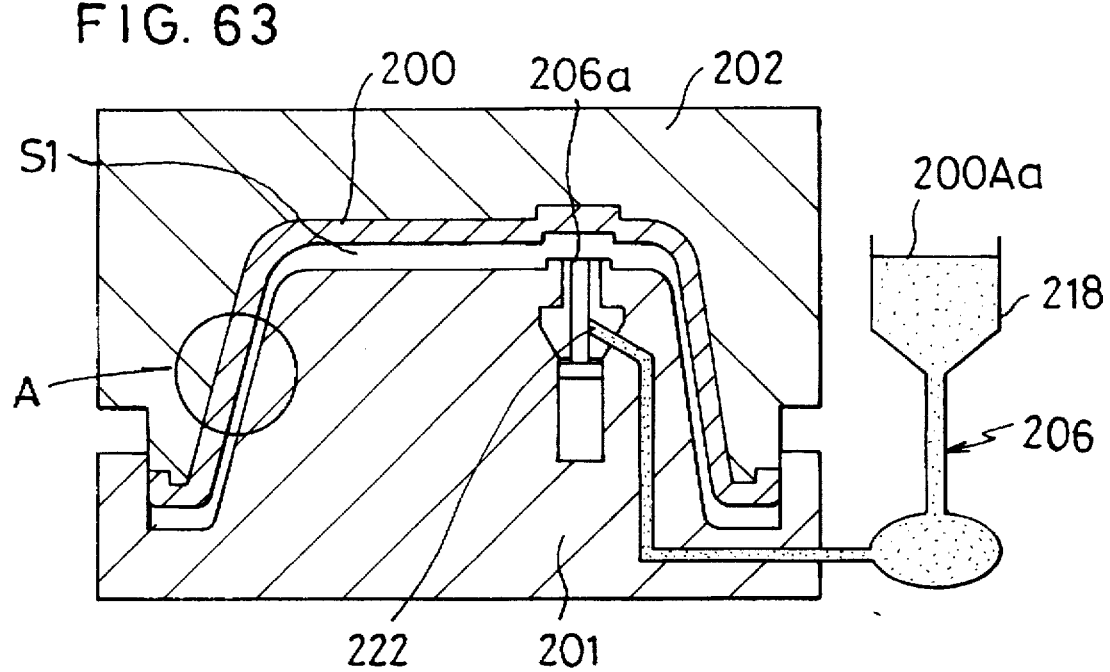
Figure 64:
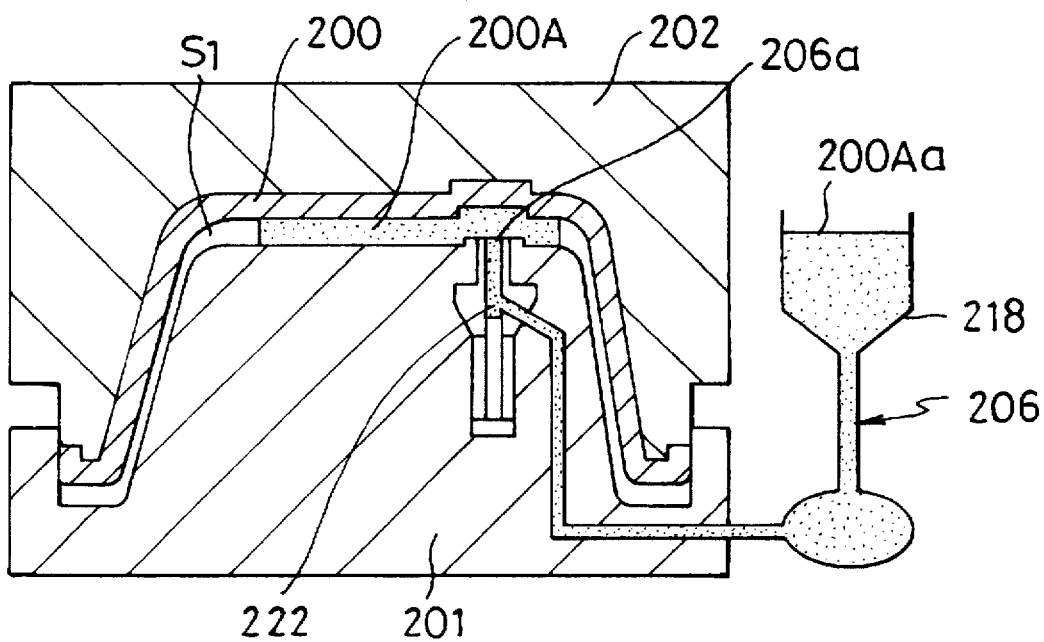
Figure 67:
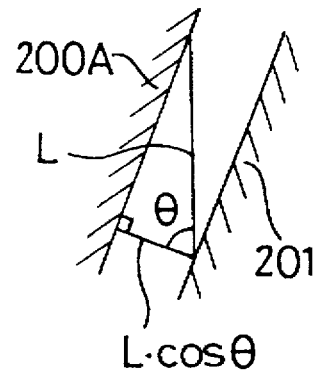
FIG. 67 is a magnified view for explaining the width of the space at a part A encircled in FIG. 63.

The arrangement and function of these lower and upper molds 201 and 202, coating material supply device 206 and their linking members are the same as those of the resin-coating apparatus in the foregoing working aspect with reference to FIG. 14. Now, in forming the molding 200 with the above apparatus and manufacturing the bathtub having the resin coating layer 200A on the surface of this molding 200, the following steps are executed. That is, as in FIG. 61, first, the upper mold 202 is moved upward to define the space S, and in this state the molding material M constituting the material for the molding 200 is placed on the lower mold 201. Here, the fiber reinforced thermosetting resin can be employed as the molding material, in which an unsaturated polyester resin or the like, such filler as calcium carbonate or aluminum hydroxide, such fibrous reinforcement as glass fibers or carbon fibers, and such additives as a thickening agent, colorant and the like as occasion demands are blended, and the molding material is loaded on the lower mold 201 as the BMC (bulk molding material), SMC (sheet molding material) or the like. Next, as in FIG. 62, the upper mold 202 is lowered to have the mold clamped and the molding material M compressed under a pressure, and the molding 200 is formed. Then, the upper mold 202 is slightly lifted up as in FIG. 63, the slight space S1 is formed thereby between a surface of the molding 200 and the lower mold 201, and then the valve 222 is opened as in FIG. 64 to have the coating material 200Aa consisting of a resin of unsaturated polyester, vinyl ester, epoxy, acrylic or the like series injected from the injecting port 206a through the coating material supplying device 206 into the slight space S1 between the surface of the molding 200 and the lower mold 201. While at this time the upward movement of the upper mold 202 is effective to produce the space S1 of an identical length to upward moving distance L fo the upper mold 202 with respect to such horizontal plane parts as the flange part 200a, bottom surface part 200b, the gap with respect to slanted surface parts of the elected surfaces 200c other than the horizontal plane parts between the respective corner parts 200d is represented by L×cos, which is shorter than L, as seen in FIG. 67. In molding the bathtub, therefore, the coating material 200Aa charged in portions facing the horizontal plane parts of the flange parts 200a and main-body bottom surface part 200b is made larger in charged thickness than that of the coating material 200Aa at other portions than the horizontal plane parts, and a sufficient reinforcement can be attained.

Figure 65:
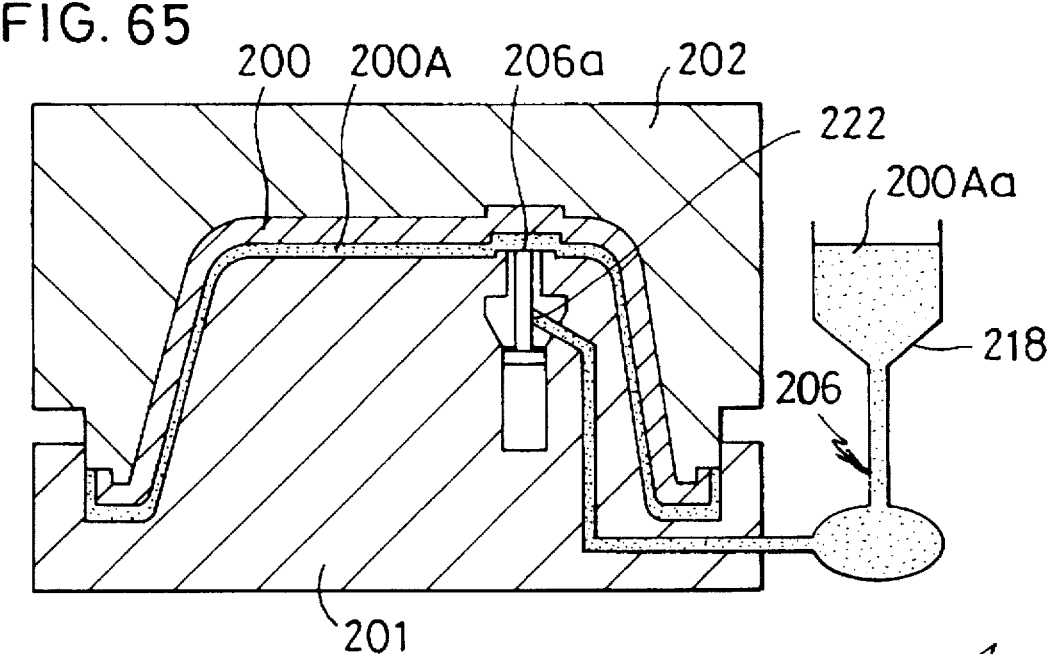
Figure 66:
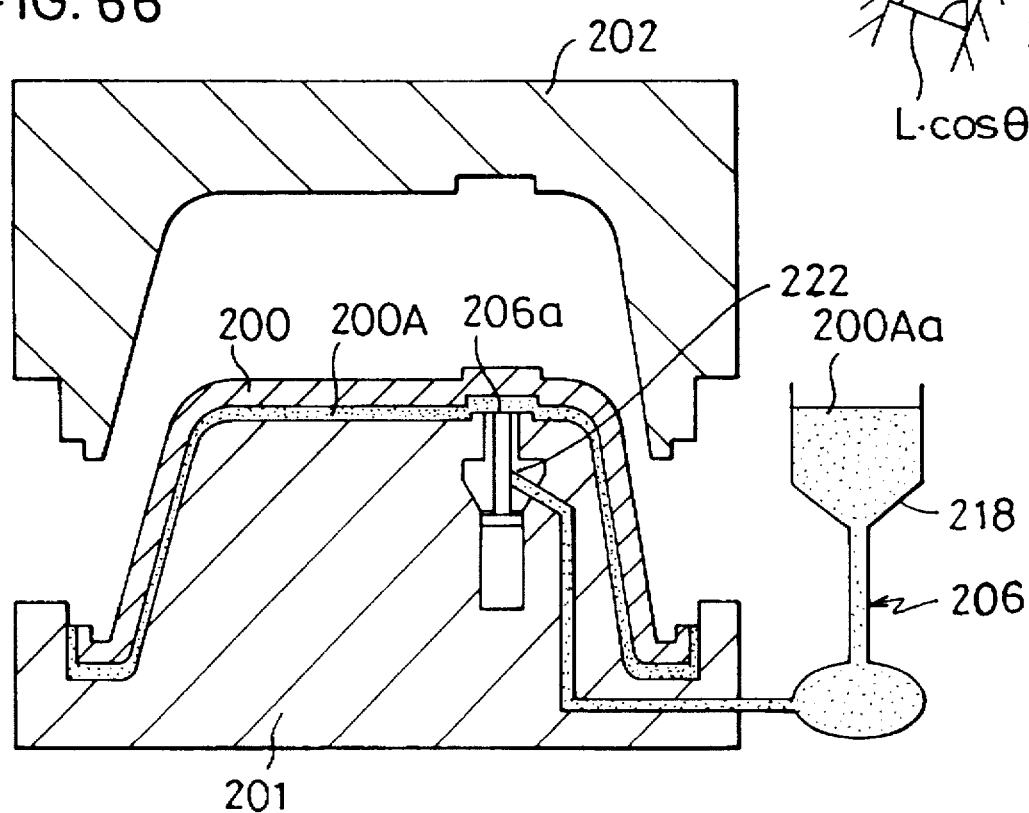

When the injection of the coating material 200Aa is completed in this manner, the valve 222 is closed as in FIG. 65, and the re-compression molding is carried out. Subsequent to this re-compression molding, the upper mold 202 is lifted up as in FIG. 66 to open the molds, and in this state the bathtub is taken out. In this case, it is made easier to perform the forming work of the exhaust hole with respect to the bathtub thus taken out, so long as the position of the injecting port 206a for the coating material of the coating material supply device 206 is made to correspond to the position of the exhaust hole of the bathtub and the arrangement is so made as to provide, for example, the coating material supply device 206 at the position of the upper mold 202 for forming the hole in the molding 200 itself as in FIGS. 25 to 45 or FIGS. 52 to 57. In the bathtub manufactured in this way, the resin coating layer 200A is formed excellently on the surface of the molding 200, and this resin coating layer 200A is made thicker at such horizontal plane portions as the flange parts 200a and main-body bottom surface part 200b than such other portions as the elected surfaces 200c. Measurement of the thickness at respective portions of the resin coating layer 200A in one of the products formed in the foregoing manner has shown that the flange part 200a was about 500 μm, the main-body bottom surface 200b was about 700 μm, the corner parts 200d were about 80 μm and the elected surfaces 200c between the respective corner parts were about 150 μm. While there occurs a slight difference in the thickness between the flange parts 200a and the main-body bottom surface part 200b both forming the horizontal plane parts, this is due to a fluctuation occured depending on the molding conditions or the like, and the difference to such extent gives no influence on the increase of strength. Further, in order to improve the strength at the corner parts 200d, for example, parts of the molding 200 corresponding to the corner parts 200d may be made thicker so as to enlarge an amount of shrink of the molding 200. It is also preferable to render the thickness of the resin coating layer 200A at such horizontal plane parts as the flange parts 200a and main-body bottom surface part 200b to be larger more than twice as large as that of other parts.

In addition, it is also possible to employ a coating material 200Aa to which such inorganic substance as a mica powder, glass powder or the like or a metal powder of copper, nickel, aluminum or the like is added, so that the coating material will be colored or provided with an effect.

It is claimed:

1. A process for resin-coating a resin molding, said process employing male and female mold sections separable relative to one another along a clamping direction, said male and female mold sections including opposing male and female mold surfaces, respectively, each of said mold surfaces including an outer peripheral surface region tapered with respect to said clamping direction, said outer peripheral surface regions facing one another, the process comprising the steps of:

A) compressing a resin molding material within a first space formed between said mold surfaces, whereby said molding material occupies the portion of said first space disposed between said outer peripheral surface regions;

B) partially separating said male and female mold sections to form a second space between said molding material and one of said mold surfaces prior to complete curing of said molding material;

C) flowing a gas into said second space, and discharging said gas from between said peripheral surface regions to discharge foreign matter from said second space;

D) injecting a resin coating material into said second space, including the portion of said second space disposed between said molding material and said outer peripheral surface region of said one mold surface, said resin coating material contacting said molding material; and E) pressing said male and female mold halves together to effect further curing.

2. A process according to claim 1, wherein step D is performed by rendering the injection position of the fluid coating material into said second space to correspond to a position of a hole to be provided in a final molded product.

3. A process according to claim 1, wherein after step E a fluid selected from the group consisting of a gas or liquid which is inert to the resin molding and coating materials, is injected from an injecting port provided in one of the mold sections to apply a pressure to an outer surface of the molding material.

4. A process according to claim 1, wherein one of the mold sections is provided with an injecting port for the coating material, and a fluid selected from the group consisting of a gas or liquid which is inert to the resin molding and coating materials, is injected through the injecting port after the injection of the coating material to apply a pressure to an outer surface of the molding material.

5. A process according to claim 1, wherein one of the mold sections is provided with an injecting port for the coating material, and a fluid selected from the group consisting of a gas or liquid which is inert to the resin molding and coating material, is injected from the injecting port substantially simultaneously with the injection of the coating material in step D to apply a pressure to an outer surface of the resin molding material.

6. A resin-coating apparatus comprising first and second molds having respective male and female mold surfaces each defining an outer peripheral surface region tapered with respect to a clamping direction of the first and second molds; a coating-material injecting means disposed in one of the first and second molds and including an outer tip end; the injecting means including an injecting port extending through the tip end and communicable with a molding space formed between the male and female mold surfaces; an auxiliary mold movably mounted in the other of the first and second molds in mutually facing, non-engaging relationship with the tip end of the injecting means; and a plug member movably mounted in the injecting port for opening and closing the injecting port.

7. An apparatus according to claim 6, wherein outermost peripheral ends of the first and second molds form a leak-resisting space communicating with the tapered surface regions, the leak-resisting space formed between stepped portions of the first and second molds; each of the stepped portions including inner and outer shear edges; the inner shear edges facing one another to form a first section of the leak-resisting space; the outer shear edges facing one another to form a second section of the leak-resisting space which is narrower than the first section; the first and second sections arranged so that leaking material from the molding space enters the first section before entering the second section.

8. The apparatus according to claim 6, wherein outermost peripheral ends of the first and second molds form a leak-resisting space communicating with the tapered surface regions, the leak-resisting space formed between stepped portions of the first and second molds; each of the stepped portions including inner and outer shear edges; the inner shear edges facing one another to form a first section of the leak-resisting space; the outer shear edges facing one another to form a second section of the leak-resisting space which is longer than the first section; the first and second sections arranged so that leaking material from the molding space enters the first section before entering the second section.

9. An apparatus according to claim 8, wherein the auxiliary mold is retractable with respect to the one of the first and second molds.

10. An apparatus according to claim 8, wherein the tip end of the injecting means is tapered.

11. An apparatus according to claim 8, wherein the tip end of the injecting means is disposed close to the auxiliary mold for extending partways through molding material disposed in the molding space, so as to form the molding material with a thin part.

12. An apparatus according to claim 11, wherein the auxiliary mold is provided with a recess into which the thin part enters when coating material injected from the injecting port of the injecting means is injected along a surface of the molding material and breaks off the thin part of the molding material.

13. An apparatus according to claim 8, wherein the mold surface of the one of the first and second molds is provided with means surrounding the tip end for restraining a flowing of the coating material therepast.

14. An apparatus according to claim 13, wherein the flow restraining means is one of a groove and a projection.

15. An apparatus according to claim 8, wherein an air nozzle means is provided on the one of the first and second molds for ejecting air into the molding space, the air nozzle means includes a cylinder movable towards and away from the molding space, and an air valve independently movable within the cylinder for opening and closing a flow path in the cylinder, the air nozzle means being opened to eject air urging the molding material against the other of the first and second molds.

* * * * *